US008838696B2

(12) United States Patent
Tiwari et al.

(10) Patent No.: US 8,838,696 B2
(45) Date of Patent: Sep. 16, 2014

(54) METHOD AND APPARATUS TO PROVIDE AN ECOSYSTEM FOR MOBILE VIDEO

(75) Inventors: Abhishek Tiwari, Santa Clara, CA (US); Jonah Kaj Fleming, Scotts Valley, CA (US); Alan Michael Vale, Palo Alto, CA (US)

(73) Assignee: Syniverse Technologies, LLC, Tampa, FL (US)

( * ) Notice: Subject to any disclaimer, the term of this patent is extended or adjusted under 35 U.S.C. 154(b) by 197 days.

(21) Appl. No.: 13/232,953

(22) Filed: Sep. 14, 2011

(65) Prior Publication Data

US 2012/0066355 A1  Mar. 15, 2012

Related U.S. Application Data

(60) Provisional application No. 61/383,287, filed on Sep. 15, 2010.

(51) Int. Cl.
*G06F 15/16* (2006.01)
*G06F 12/00* (2006.01)

(52) U.S. Cl.
USPC .......................................... 709/205; 709/250

(58) Field of Classification Search
CPC . H04L 12/1822; H04L 63/065; H04L 63/062; H04L 63/123; H04L 63/126; H04L 9/0822; H04L 9/0825; H04L 9/0833; H04L 9/0891; H04L 12/1818; H04L 12/189; H04L 51/04; H04L 63/104; H04L 63/107
USPC ......................... 709/220–221, 231–233, 250
See application file for complete search history.

(56) References Cited

U.S. PATENT DOCUMENTS

| | | | |
|---|---|---|---|
| 2003/0074558 A1 | 4/2003 | Riggs | |
| 2006/0136575 A1 | 6/2006 | Payne et al. | |
| 2006/0136597 A1* | 6/2006 | Shabtai et al. | 709/231 |
| 2006/0230169 A1* | 10/2006 | Kaplan et al. | 709/231 |
| 2007/0112811 A1* | 5/2007 | Shen et al. | 707/101 |
| 2008/0134235 A1* | 6/2008 | Kalaboukis | 725/32 |
| 2008/0195748 A1* | 8/2008 | Tierney et al. | 709/232 |
| 2009/0052540 A1* | 2/2009 | Gutman et al. | 375/240.24 |
| 2009/0061840 A1 | 3/2009 | Fleischman et al. | |
| 2009/0089683 A1* | 4/2009 | Thapa | 715/756 |
| 2009/0119736 A1 | 5/2009 | Perlman et al. | |
| 2009/0319563 A1* | 12/2009 | Schnell | 707/103 R |

FOREIGN PATENT DOCUMENTS

| | | |
|---|---|---|
| WO | WO 2006/066077 | 6/2006 |
| WO | WO 2008/072093 | 6/2008 |
| WO | WO 2009/073798 | 6/2009 |

OTHER PUBLICATIONS

PCT/US/11/51832, International Preliminary Report on Patentability, Date of Mailing Mar. 28, 2013, 7 pages.
PCT/US/11/51832, International Search Report and the Written Opinion, Date of Mailing Jan. 18, 2012, 10 pages.
European Search Report for Application No. EP 11 82 5974, mailed Nov. 14, 2013, 8 pages.

* cited by examiner

*Primary Examiner* — Zarni Maung
(74) *Attorney, Agent, or Firm* — HIPLegal LLP; Judith A. Szepesi

(57) ABSTRACT

A method or apparatus to provide a video ecosystem is described. The video ecosystem, in one embodiment, permits live video streaming between users on different platforms, carriers, and/or devices.

31 Claims, 28 Drawing Sheets

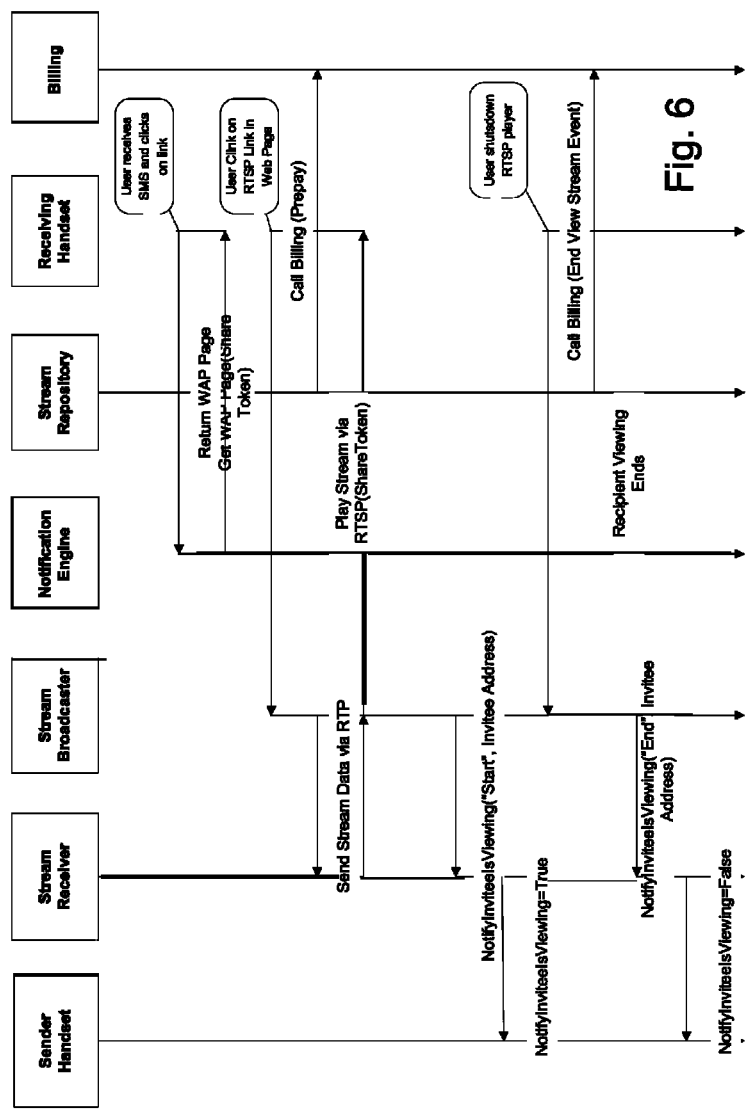

METHOD AND APPARATUS TO PROVIDE AN ECOSYSTEM FOR MOBILE VIDEO

RELATED APPLICATION

The present invention claims priority to U.S. Provisional Patent Application No. 61/383,287, filed on Sep. 15, 2010, and incorporates that application in its entirety.

FIELD OF THE INVENTION

The present invention relates to video, and more particularly to an ecosystem for video.

BACKGROUND

As mobile devices are improving, cameras are being incorporated into more and more mobile devices. Some of these cameras are capable of taking video as well as still images. Today, users are able to send pictures and videos to each other and to social networking sites.

SUMMARY

A method and apparatus to enable a video connection between an invitee and a streamer. In one embodiment, the invitee and the streamer may be on different carriers, different networks, different devices, different platforms, etc. In one embodiment, the connection may be a full duplex connection in which each party is streaming video to the other party.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a signal diagram of one embodiment of receiving a live broadcast.

DETAILED DESCRIPTION

The method and apparatus described is a video ecosystem that is designed, in one embodiment to enable video interaction between users on different devices, with different provides, and even different platforms. This cross-carrier, cross-standard system integrates the disparate devices currently providing partial video capabilities. The system enables interaction between standards-based and proprietary systems. The system enables a user with a smart phone such as the IPHONE™, or an ANDROID™ phone to directly stream video to another user on another network, or even on a desktop computer, instant messaging application, SKYPE™ system or another platform. The video ecosystem provides the ability to translate between various formats, and ensure that regardless of the capabilities of the receiving device the best possible quality of video data is provided. In one embodiment, the system further provides for video call ability, which may include full duplex video. In one embodiment, users may further stream video to multiple recipients. Other features will be discussed below.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. The term in one embodiment is used in the present specification. This is not meant to imply that these features reside in the same embodiment, merely that they may be present in one embodiment, while being absent in another.

Figure 1:
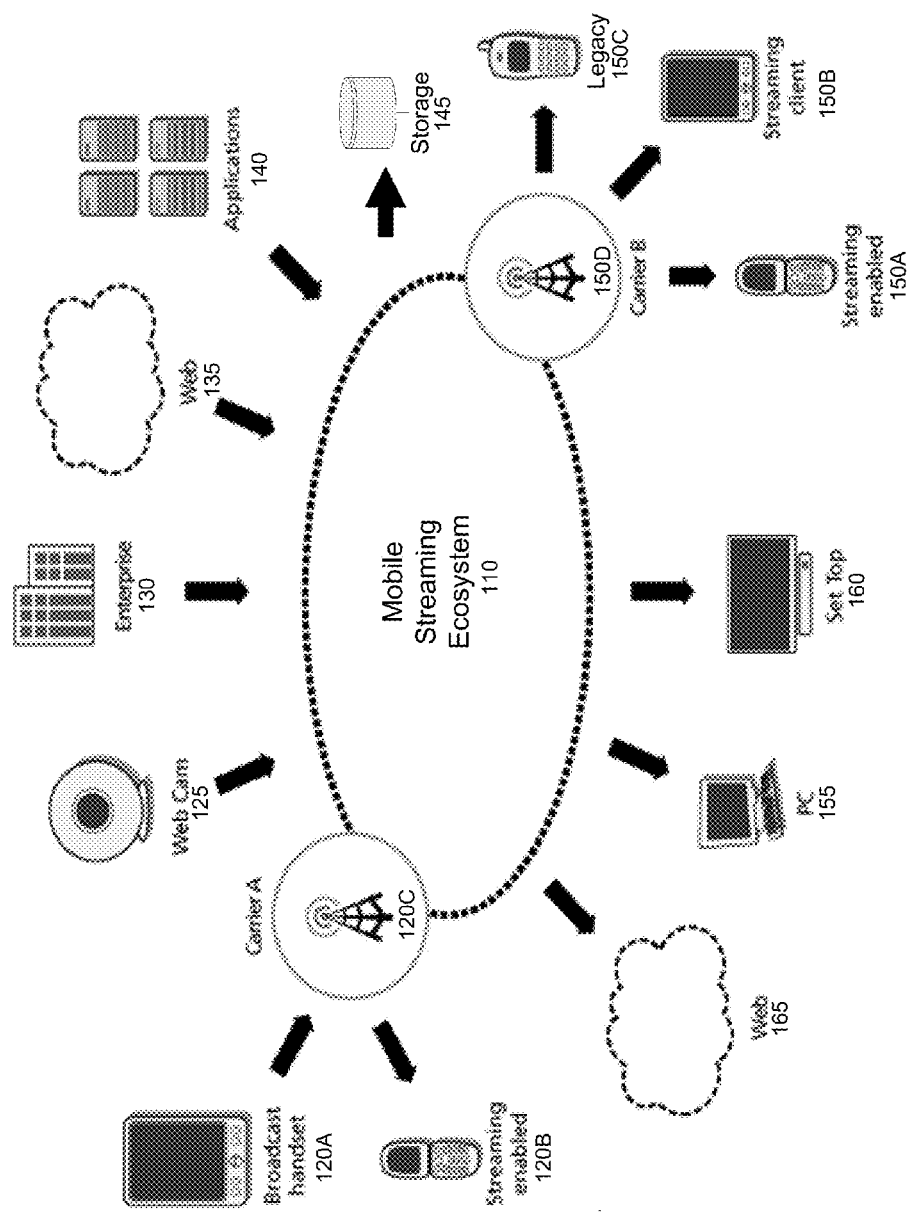
FIG. 1 is a diagram illustrating one embodiment of a mobile streaming ecosystem, which may be accomplished with the present invention in one embodiment.

FIG. 1 is a diagram illustrating one embodiment of a mobile streaming ecosystem, which may be accomplished with the present invention. The mobile streaming ecosystem 110 provides video services to a plurality of devices, and/or applications. In one embodiment, various sources can send and receive video through the mobile streaming ecosystem 110. Video may be exchanged between two or more people. This includes broadcasting, in one embodiment. The term "broadcasting" is used to describe distribution of audio and video content to a dispersed audience through a transmission media. It does not imply that more than one person receives the broadcast, or that it is directed to the public. The term "streaming" is used to describe the primarily continuous transmission of video data. However, although the term "stream" is used, this does not imply that there cannot be interruptions in the data. The present application will generically use the term "communicate" to describe the exchange of data between two or more people. This is meant to encompass sending and receiving data, whether one-to-one, one-to-many, or many-to-many.

The data sources, shown on top of FIG. 1, may include, for example one or more mobile devices 120A, 120B, coupled through carrier A 120C. A web cam 125 may also originate data. In addition, an enterprise 130 may originate data. Additionally applications 140 may originate data as well. In one embodiment, the mobile stream ecosystem may provide the ability to add and integrate video capability into non-video applications. In one embodiment, the stream may be originated through a network (web) 135, which may be coupled to any other type of device that can generate and send video data.

The data may be sent to various devices. In one embodiment, it may be sent to storage 145. The broadcast may also be sent to various devices 150A, 150B, 150C supported by carrier B 150D. In one embodiment, the devices may be streaming enabled as handset 150A, running a streaming client to enable receipt of the streaming data as handset 150B, or a legacy device 150C for which the streaming data is modified to the best format that legacy device 150C can receive. In one embodiment, the data may be received by handsets supported by different carriers.

A computer system 155, or set-top device 160, may also be used to receive the stream. In one embodiment, the computer system 155 may receive the data via the Web, natively, or via an application such as SKYPE™ or other video-enabled application.

The stream may further be transmitted to a network 165. In one embodiment, a single stream may be distributed to more than one device and/or platform. Of course, while only a single carrier is illustrated as receiving the stream, the stream may be directed to devices coupled to multiple different carriers.

The mobile streaming ecosystem 110, in one embodiment, is designed communication of live video data from one or more of multiple platforms and devices, to one or more of multiple platforms and devices. The ecosystem 110 in one embodiment handles any transcoding, protocol change, or other steps to ensure that each sender and recipient has a positive experience. In one embodiment, the system supports the best quality of data sending and/or receipt possible with the devices, networks, and bandwidth available. Of course, the set of devices and carriers supported be different from those illustrated in this figure.

Figure 2A:
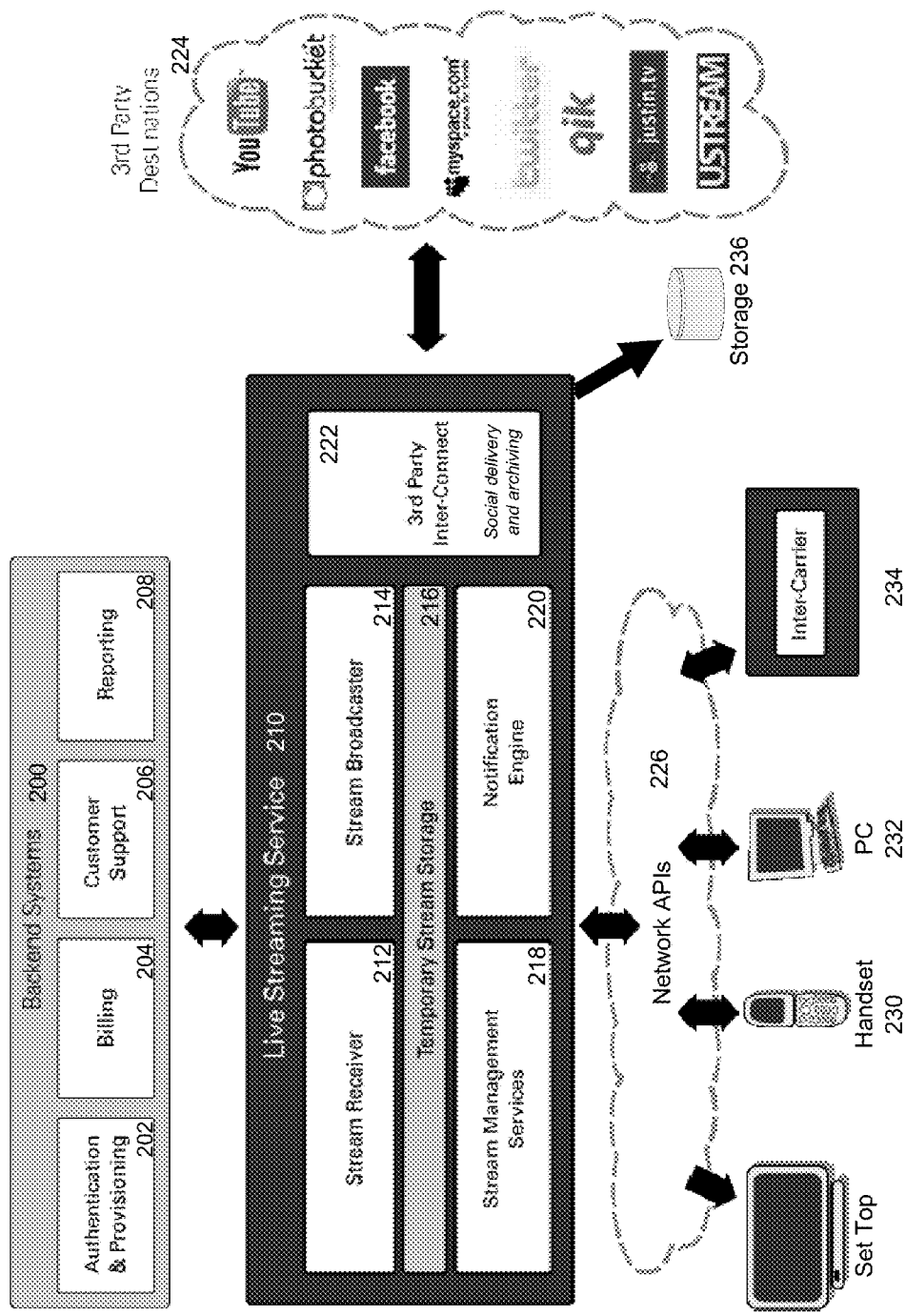
FIG. 2A is a block diagram of one embodiment of a logical architecture of the system.

FIG. 2A is a block diagram of one embodiment of a logical architecture of the system. Although the architecture is illustrated single system, one of skill in the art would understand that the elements of the architecture may be distributed, using a distributed server system, distributed storage, cloud storage, etc. The physical location of the elements in the system is not relevant to the invention.

The system provides a video broadcast service 210 supported by backend systems 200. The video broadcast service 210 provides the ability to communicate with third party destinations 224, in one embodiment via $3^{rd}$ party inter-connect 222. In one embodiment, a separate inter-connect system 222 exists for each third party with which the video broadcast system 210 interacts. In one embodiment, the third party destinations 224 may include social networks such as FACEBOOK™ or TWITTER™ or other networks that may be used to communicate information, which may include video streaming. In one embodiment, the third party destinations 224 may include video repositories such as YOUTUBE™ or similar destinations, which may allow live viewing, as well as recording. In one embodiment, the third party destinations 224 may provide storage for the video data, after it is streamed.

In one embodiment, the video broadcast service 210 may further interact with network APIs (application programming interfaces) 226 that are associated with various devices 230, 232, and 234. In one embodiment, the network APIs 226 may provide an interface for inter-carrier connections (e.g. connections between carriers), as well as directly to handsets or computing devices.

The video broadcast service 210 may include a stream receiver 212 to receive a stream from a device. As noted above, this device may be a mobile phone handset, a webcam, an application, an enterprise, etc. The stream is temporarily stored in temp broadcast archive 216, in one embodiment. The stream broadcaster 214 provides the stream with an indication of the destination(s). In one embodiment, the destinations are specified by the streamer (the person/company who originates the stream) and are part of the metadata associated with the stream.

In one embodiment, notification engine 220 sends a notification to the invitee(s) to view the stream. In one embodiment, notification engine may interact with $3^{rd}$ party inter-connect 222 to provide notifications via a third party destination. The notification engine 220 may also interact with network APIs 226 to provide notification directly to a device. This notification may be via short message service (SMS), multimedia messaging service (MMS), or voice call to a mobile device, via email, or via any other messaging media.

Broadcast management service 218 manages the translation and adjustment of the streams. In one embodiment, broadcast management service 218 also provides communications between the streamer and invitee(s) (and vice versa in one embodiment). Note that although the term broadcast is used, it does not mean that the stream must be a one-to-many connection.

The video broadcast service 210 interacts with backend systems 200, in one embodiment. The backend systems 200 provide billing, and billing authorization 204. In one embodiment, there may be direct billing, and/or billing through a service provider such as a cellular network provider. Backend systems 200 may also include reporting 208. In one embodiment, reporting 208 includes reports provided to the streamer, and in one embodiment to recipients, regarding the broadcast. In one embodiment, reporting 208 may also be provided to carriers, enterprises, and any other designated recipients of data.

In one embodiment, authentication and provisioning 202 provides relevant applications. In one embodiment, these applications may be optional, but may provide a better experience in streaming or receiving a stream. In one embodiment, certain devices need an application, if streaming/receiving is not natively supported.

In one embodiment, temp broadcast archive 216 may store the stream temporarily, and enable an authorized user to tag a stream with relevant information. In one embodiment, the temp broadcast archive may send the completed stream to storage 236, enabling later replay of the stream. In one embodiment, this may be set by the streamer's preference. By storing the video data on the server, the memory requirements for a mobile device recording the stream can be reduced. Instead of requiring a mobile device to record a full-length video, and then transmit it to a destination, the system enables immediate transmission of the stream, requiring only sufficient memory to buffer the upload on the mobile device. This is a significant difference in terms of memory size, and would enable a device to record a longer video without a corresponding increase in memory.

Figure 2B:
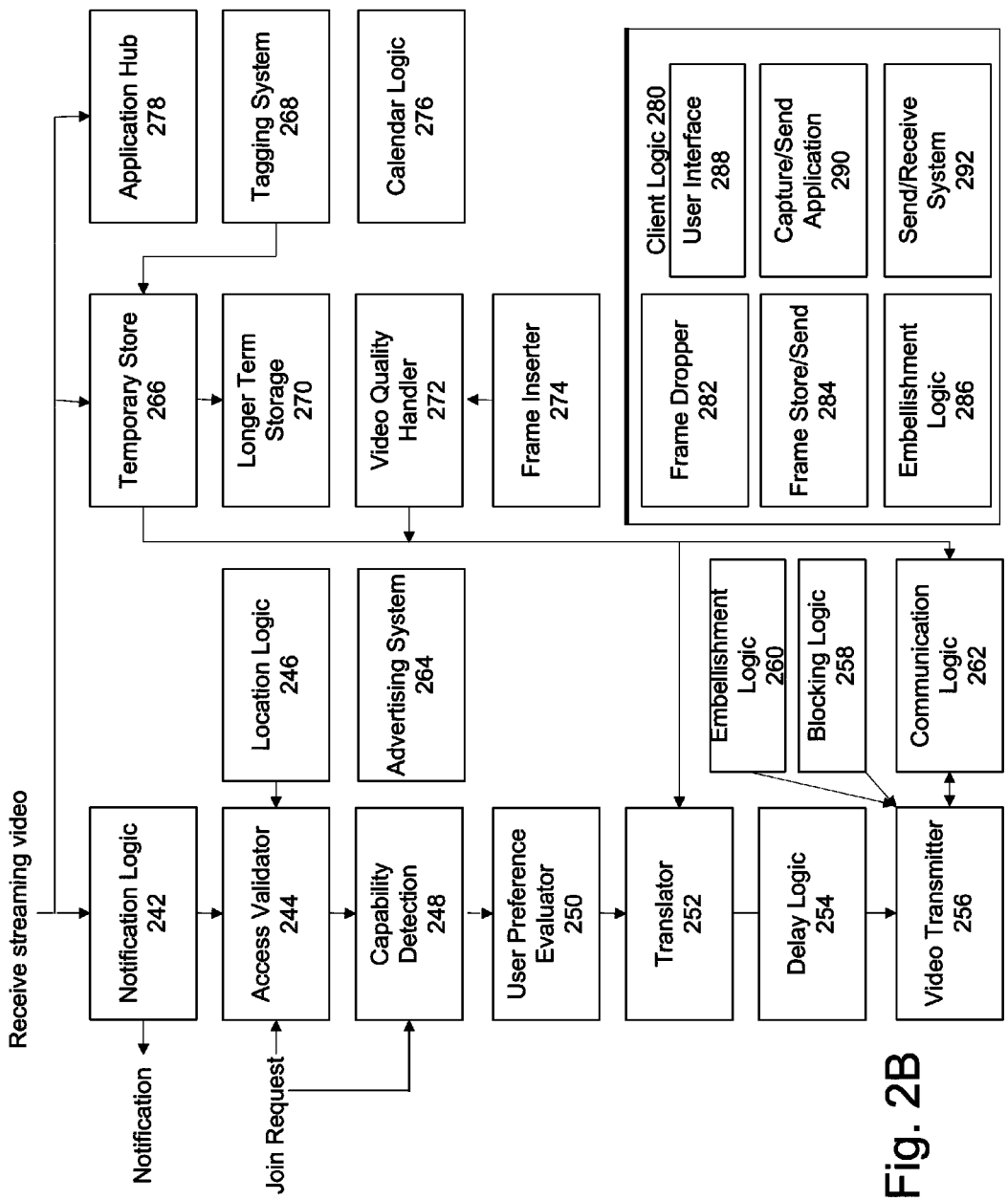
FIG. 2B is a block diagram of one embodiment of the mobile streaming ecosystem.

FIG. 2B is a block diagram of one embodiment of the mobile streaming ecosystem. The streaming video is received by notification logic 242. Notification logic 242 identifies the destinations for the stream, and sends out appropriate notifications, if any are needed. In one embodiment, notification logic 242 only receives metadata, indicating destinations for the stream.

In response to the notification, one or more destinations may send a join request, indicating that they wish to receive the stream. Access validator 244 receives the join request, and verifies that the requester is one of the designed recipients of the stream. In one embodiment, the stream may be location restricted, and location logic 246 would verify that the join request was received from a location that may receive the stream.

If the access validator 244 indicates that the requester should be permitted to join, the request is passed to the capability detection 248. Capability detection 248 determines the capabilities of the recipient's device, network connection, and/or available bandwidth. If no such information is available, the system may assume a default set of preferences.

In one embodiment, user preference evaluator 250 uses information from data sent with the join request, to determine if the user has any preferences regarding the stream. For example, even if a user's device has the ability to display large images, the user may prefer to limit display size to a smaller area.

The combination of capability and preferences is used by translator 252, if needed, to translate the stream into a format appropriate for the recipient's device. The translator 252 receives the stream from temporary store 266.

The temporary store 266 receives the stream as well. It buffers the stream. In one embodiment, the temporary store 266 may move stream data to longer-term storage 270. In one embodiment, whether the stream is stored in longer-term storage 270 is controlled by the stream originator's preference settings. In one embodiment, application hug 278 receives a copy of the stream, if the stream is directed to a destination that does not natively support video. Application hub 278 can be used to enable the streaming of video to such destinations.

Delay logic 254 can insert a delay into the stream, if needed. Video transmitter 256 sends the stream to the invitees who have joined the stream. In one embodiment, communication logic 262 is used to communicate with the streamer and the recipient(s).

In one embodiment, the system may further include a video quality handler 272. Video quality handler 272 receives the video stream, and if needed adjusts the video quality. Video quality may need to be adjusted based on varying network conditions to handle the bandwidth issues. Video quality handler 272 may add or remove frames, increase or reduce image quality, increase or reduce video resolution, increase or reduce audio rate, increase or reduce audio quality to adjust the video quality. Note that video quality handler 272 adjusts video quality at the server, based on network conditions on the recipient's side and/or the broadcast side. In one embodiment, the client logic 280 may also adjust video quality prior to sending on the broadcast side, or after receiving on the receiving side.

Tagging system 268 enables the stream originator to add tags to the stream. In one embodiment, the tagging system 268 may also enable invitees to add tags to the stream as well.

In one embodiment, embellishment logic 260 enables the addition of embellishments, such as decorations, frames, and similar image effects to the stream. In one embodiment, in one embodiment, embellishment logic 260 further enables the blocking out of a portion of the image in the stream, such as the face of minor, a license plate, etc.

Blocking logic 258, in one embodiment, enables a stream to be blocked. Blocking a stream disables the stream from being sent, and/or being received. In one embodiment, blocking logic 258 may block a stream based on origination (based on the streamer) or destination (based on the recipient).

Calendar logic 276 enables the user to set up scheduled streams. In one embodiment, the calendar logic 276 may also enable users to subscribe to a scheduled stream.

Advertising system 264, in one embodiment, may add advertising or other per-stored data into a stream. In one embodiment, the advertising system 264 may overlay information, insert frames with information, or otherwise add pre-stored data into the stream.

Client logic 280, in one embodiment, may be an application or built into a device that can be used to view and/or send streams. Client logic 280 may include a user interface 288, which receives input from the user and provides output to the user.

Capture/send application 290 enables a user to capture data and send it in a stream. Send/receive system 292 enables a user to view a stream.

Frame store/send 284 may be used with capture/send application 290 to temporarily store frames. In one embodiment, the frame store/send 284 may act as a temporary buffer. Furthermore, the frame store/send 284, in one embodiment, may temporarily store frames that are removed from the stream due to bandwidth limitations. In one embodiment, such frames are stored, and later sent, by frame store/send 284. In another embodiment, such frames may be discarded by frame dropper 282.

Embellishment logic 286 enables a user to add an embellishment to the video. In one embodiment, embellishment logic 286 works with embellishment logic 260 in the server system. In one embodiment, embellishment logic 286 may download images from the server.

Figure 3A:
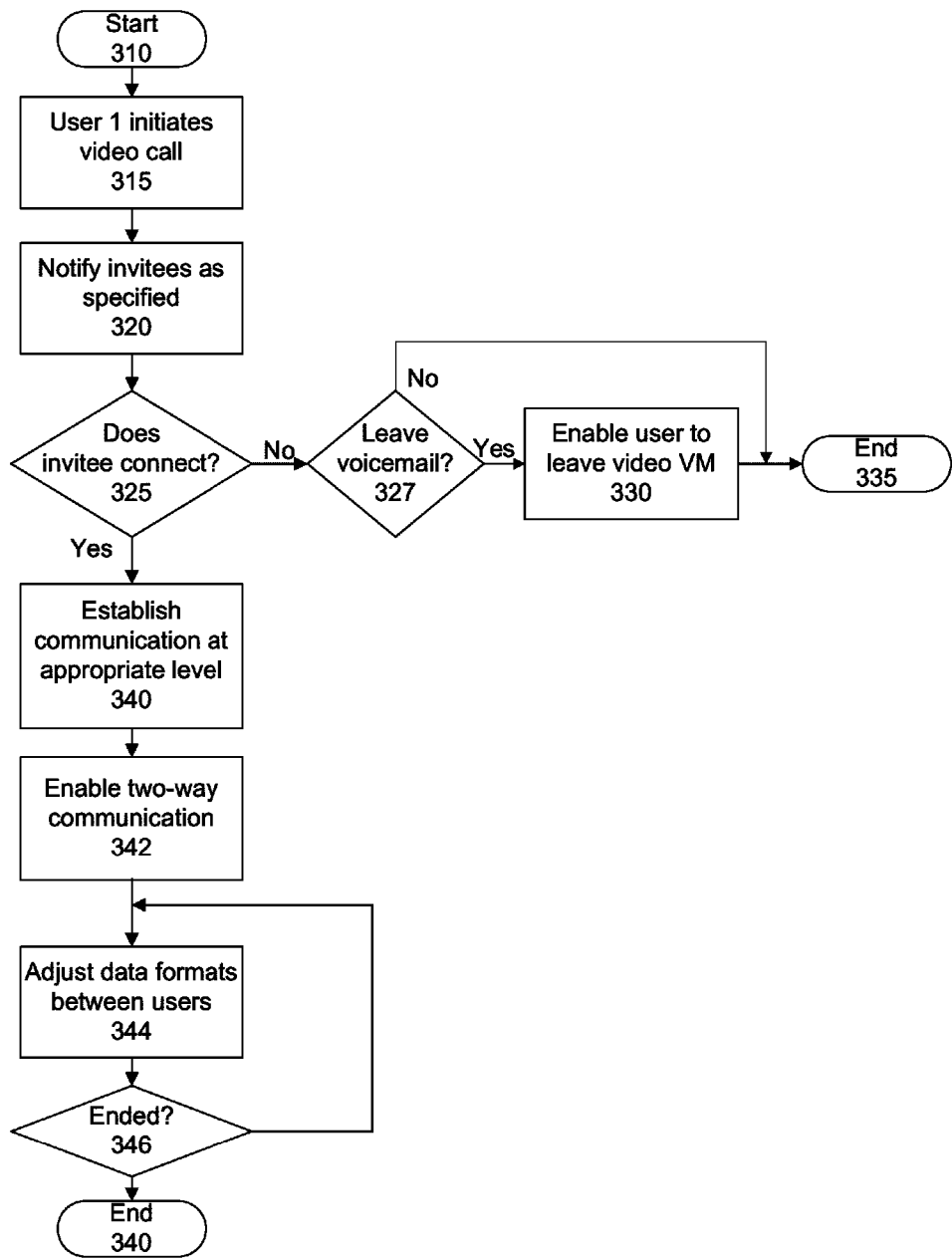
FIG. 3A is an overview flowchart of one embodiment of using one-to-one type connection with the system.

FIG. 3A is an overview flowchart of one embodiment of the system for one-to-one communication. The process starts at block 310. In one embodiment, the process starts when user one (the stream originator) initiates a video call. Initiating a video call may be done by specifying one or more invitees at block 315. In one embodiment, a stream is initiated when user one establishes a video call to one or more invitees.

At block 320, the invitees are notified, as specified. The invitees may be notified by SMS (short messaging system), MMS (multimedia message system), a telephone call, an email, or another form of notification. The particular format of the invitation may be defined by the stream originator.

At block 325, the process determines whether an invitee has connected. In one embodiment, when at least one invitee of the one or more invitees connects, the process continues to block 340. If no invitee connects, the process allows the user to leave a voicemail, in one embodiment.

In on embodiment, if no invitee connects within a time, the user is informed, and given the opportunity to leave a voicemail and/or a video voicemail. The system then determines whether the user wishes to leave a voicemail at block 327. In one embodiment, the user may indicate a wish to leave a conventional voicemail or a video voicemail by selecting an associated key. For example, the system may announce "if you wish to leave a video voicemail, press 1, if you wish to leave a normal voicemail, press 2, otherwise end the stream. If the user wishes to leave a voicemail, at block 330, the system enables the user to leave a voicemail. In one embodiment, this voicemail may be part of the stream being recorded, or a separate recording. The process then ends at block 335.

If the invitee connects, the process continues to block 340. At block 340, a communication link is established between the streamer and the invitee. Establishing this connection includes determining the platform, carrier (if appropriate), device, and bandwidth and establishing the communication link based on this information. Establishing communication link in one embodiment includes setting a protocol and identifying a codec used. In one embodiment, the frame rate, resolution, and screen size are the optimum level supported by the streaming data, the streamer's protocol/codec, and the recipient's protocol/codec. In one embodiment, a subscriber status of the invitee may be another factor to determine the quality of the streamed data.

At block 342, two-way communication is enabled if possible. Two-way communication enables the invitee to also return data to the streamer. In one embodiment, the return data may be a full video stream, enabling the users to have a face-to-face conversation. In one embodiment, the return data may be pre-recorded content, still images, screen shots, or other non-video relevant information. Full duplex two-way communication is enabled if both devices support the simultaneous sending and receiving of video.

At block 344, data formats are adjusted between the stream(s) if needed. In one embodiment, the data formats are adjusted continuously while the streams are being sent and received. This enables a person with a device that supports H.264 video encoding, for example, to communicate with someone using a webcam that supports only VGA-resolution video.

At block 346, the process determines whether the stream is over. In one embodiment this occurs when the original streamer disconnects or otherwise indicates termination of the stream. If not, the process returns to block 344 to continue streaming video and adjusting video formats. If the stream is over, the process ends at block 335.

Figure 3B:
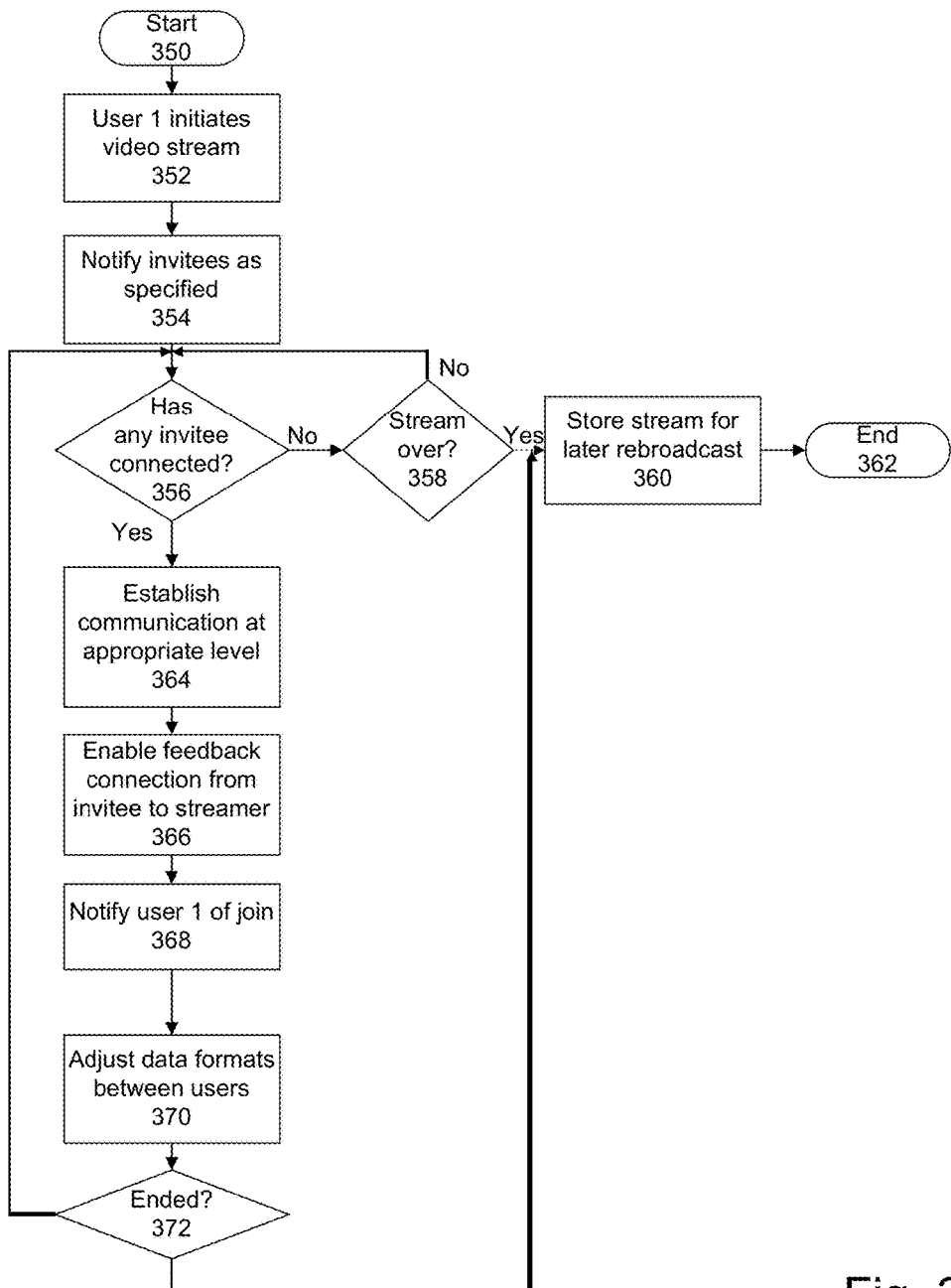
FIG. 3B is an overview flowchart of one embodiment of using a one-to-many type connection with the system.

FIG. 3B is an overview flowchart of one embodiment of the system for one-to-many communication. The process starts at block 350. In one embodiment, the process starts when user one initiates streaming. Initiating streaming may be done by specifying one or more invitees, or invitation destinations, at block 352. In one embodiment, a stream is initiated when user 1 establishes a video call to a destination/invitee.

At block 354, the invitees are notified, as specified. The invitees may be notified by SMS (short messaging system), MMS (multimedia message system), email, or another form of notification. Invitations may also be posted to a social network, such as FACEBOOK™ or TWITTER™, either publicly available or restricted to a subset such as "friends" or "followers." The particular formats of the invitation may be defined by the streamer.

At block 356, the process determines whether any invitee has connected. In one embodiment, when at least one invitee of the one or more invitees connects, the process continues to block 364. If no invitee connects within a designated timeframe, the process determines whether the stream has ended at block 358. If the stream has ended, at block 360, the stream is stored in one embodiment for later rebroadcast. The process then ends at block 362. If the stream has not yet ended, the process returns to block 356, to continue checking whether an invitee has connected.

In general, although these processes are illustrated in a flowchart form, one of skill in the art would understand that in one embodiment these processes may be interrupt driven, so rather than continuously checking whether an invitee has connected, the system maintains a thread that indicates when an invitee joins. Similarly, steps listed in a particular order in a flowchart need not be executed in that order, unless they are dependent on each other.

When an invitee connects, the process continues to block 364. At block 364, communication is established between the streamer and the invitee. Establishing this connection includes determining the platform, carrier (if appropriate), device, and bandwidth and establishing the communication at an optimum level supported based on this information.

At block 366, in one embodiment, feedback connection is established from the invitee to the streamer. This can be considered two-way communication. This enables the invitee to send data to user 1. In one embodiment, if there are multiple invitee viewers, the invitees can also send data to other invitees.

At block 368, the streamer (user 1) is notified that the invitee has joined the stream. In one embodiment, a pop-up text notification is used. Another embodiment may provide notification in one or more other formats (e.g. audio, image, etc.)

At block 370, data formats are adjusted if needed. In one embodiment, the data formats are adjusted continuously while the streams are being passed. This enables a person with a device that supports H.264/MPEG-4 video encoding, for example, to communicate with someone using a webcam that supports only Windows Media Video (WMV) encoding.

At block 372, the process determines whether the stream is over. In one embodiment this occurs when the original streamer disconnects or otherwise indicates termination of the stream. In one embodiment, this may occur if all invitees disconnect from the stream. If the stream is not yet over, the process returns to block 356 to continue monitoring for new invitees and continue adjusting video formats. If the stream is over, the process continues to block 360, in one embodiment, to store the stream for later rebroadcast, and then ends at block 362.

Figure 4:
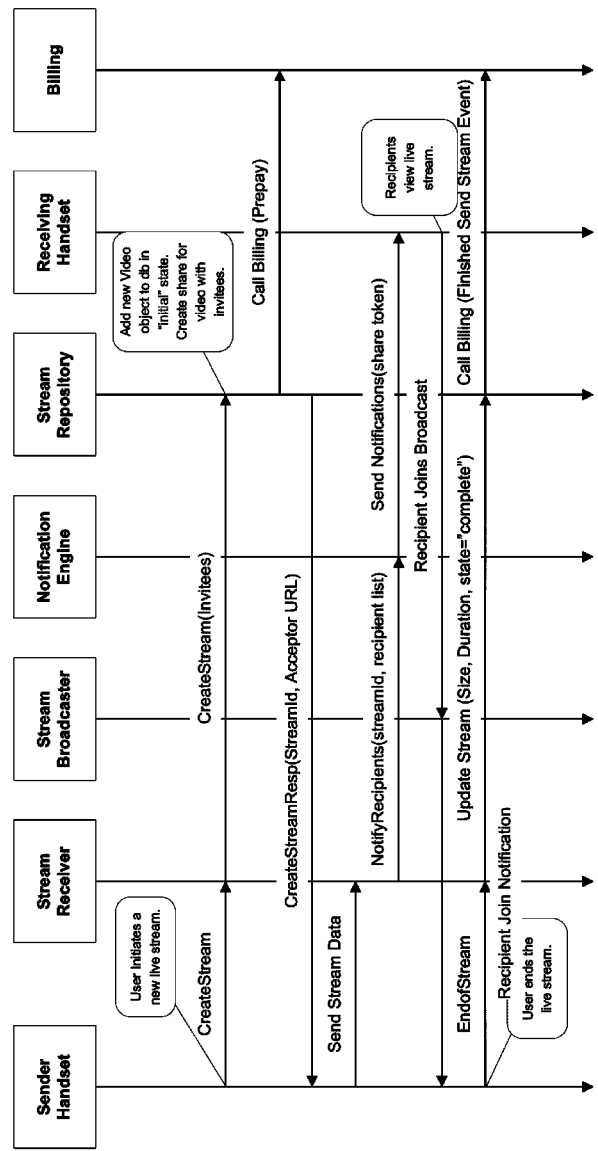
FIG. 4 is a signal diagram of one embodiment of sending and connecting to a live stream.

FIG. 4 is a signal diagram of one embodiment of sending and connecting to a live broadcast. The signal diagram illustrates one embodiment of the signals sent between the sender handset (streamer or initiator), stream receiver (server which receives the stream from streamer), stream broadcaster (which sends the stream to the receiving handset), notification engine (which sends invitations), stream repository (which stores the stream), receiving handset (the receiving user), and billing (associated with the sender's stream billing).

The user initiates a new stream, and a create stream message is sent by the sender's handset, or other initiating device, to the stream receiver. At approximately the same time, the handset sends a list of invitees, or invitation locations to the stream receiver.

The stream receiver creates a stream, and sends the invitations to the stream repository. The stream repository adds the new video object to its database, in an "initial" state. This indicates that a stream is about to start. It also creates a share for the video with invitees. A share refers to a link or location designation that would enable an invitee to view the stream. It returns the indication that a stream has been created, and in one embodiment provides a URL (universal resource locator) or other location that may be used by the invitees to access the stream. In one embodiment, the stream repository contacts billing to authorize the stream. This billing is on behalf of the stream originator, in one embodiment.

The sender sends the stream data to stream receiver. Stream receiver, as it receives the stream data, creates a notification, which includes the stream ID and recipient list. The notification engine then sends the notifications, via a predefined path to the receiving handset.

In one embodiment, the stream repository also communicates with the billing system. The billing system authorizes the streaming handset, in one embodiment.

The receiving handset joins the broadcast, and the receiving handset sends a join notice to the stream broadcaster. The stream broadcaster then sends the recipient join notification to the sender, so that the streamer receives a notice that a new recipient has joined the stream. The sender continues to send data to the stream receiver, which is then sent on by the stream broadcaster to the receiving handset.

If the communication is a two-way stream, the recipient in turn initiates a stream, becoming the sender, while remaining a receiving handset. In one embodiment, the process described above is used to join the original sender to the stream, as the recipient. In another embodiment, if the recipient initiates a stream, the sender is automatically joined, and no other invitations are sent.

When the sender handset indicates that the stream has ended, the stream receiver updates the stream to indicate that it is complete. In one embodiment, other information about the stream may be added by stream receiver and/or stream repository. This information may include file size, duration, format, etc. In one embodiment, stream repository indicates to the billing server that the stream has ended. In one embodiment, the stream may be stored by the stream repository. In one embodiment, the storing preference may be set by the sender. The stream may be discarded by stream repository after the live streaming is ended.

Figure 5:
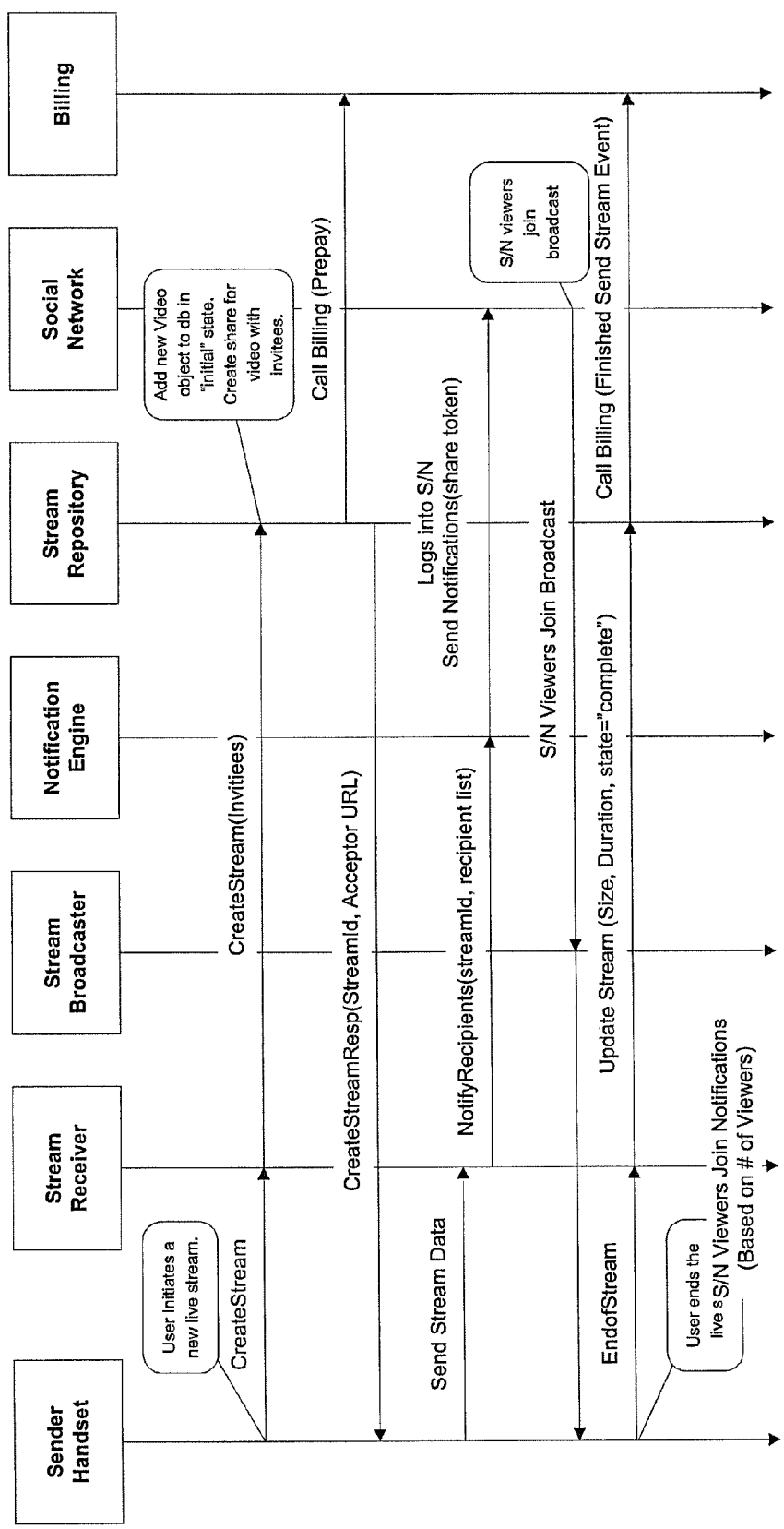
FIG. 5 is a signal diagram of one embodiment of sending out a broadcast via a social network.

FIG. 5 is a signal diagram of one embodiment of sending out a broadcast via a social network. As can be seen, in one embodiment the process is quite similar to what was described with respect to FIG. 4 above, except that the notification engine sends the notification to the social network, and the social network viewers join the broadcast. In one embodiment, the notification to the streamer of the invitees joining is an incrementing of the viewer count by social network, as shown for example in FIG. 12B, rather than the viewer's name as in a one-to-one (shown in FIG. 12A). In one embodiment, in addition to the notification there may be a total count of the number of viewers. In one embodiment, the viewer count may show the number of viewers as well as the number of invitees, e.g. "7 out of 10 are watching." In one embodiment, a single stream may include individual invitees as well as invitees through a social network. One of skill in the art would understand the combination of FIGS. 4 and 5, which would be utilized in such a case.

FIG. 6 is a signal diagram of one embodiment of receiving a live broadcast stream illustrated from the perspective of a recipient. The same elements are present as discussed above in FIGS. 4 and 5, sender handset, stream receiver, stream broadcaster, notification engine, stream repository, receiving handset, and billing.

The user receives an SMS (or other message) and clicks on the link to join a broadcast. In one embodiment, an HTML (hypertext markup language) message is sent to the notification server. In one embodiment, a WAP (wireless access protocol) message is sent to the notification server. In one embodiment, the notification server is a Web/WAP server. In one embodiment, a WAP or HTML page specified by the SMS is returned to the receiving handset.

The user can then click on the link in the web page, to connect to stream broadcaster, and thus the stream. In one embodiment, the link in the webpage is an RTSP (real-time streaming protocol) link. In another embodiment, the notification may directly include the RTSP link. In one embodiment, the stream is sent via RTP (real-time protocol). Prior to the stream starting, in one embodiment, the stream repository contacts the billing server, if the system is based on pre-pay billing. At the end of the stream, the stream repository contacts the billing server again, to indicate the end of the stream.

In this example, the recipient shuts down the player, to end the stream. Of course as noted above, the sender may terminate the stream as well. When the recipient viewing ends, a notice is sent to the stream broadcaster. This may in one embodiment, generate a notice to the streamer indicating that recipient no longer is viewing the broadcast.

Figure 7A:
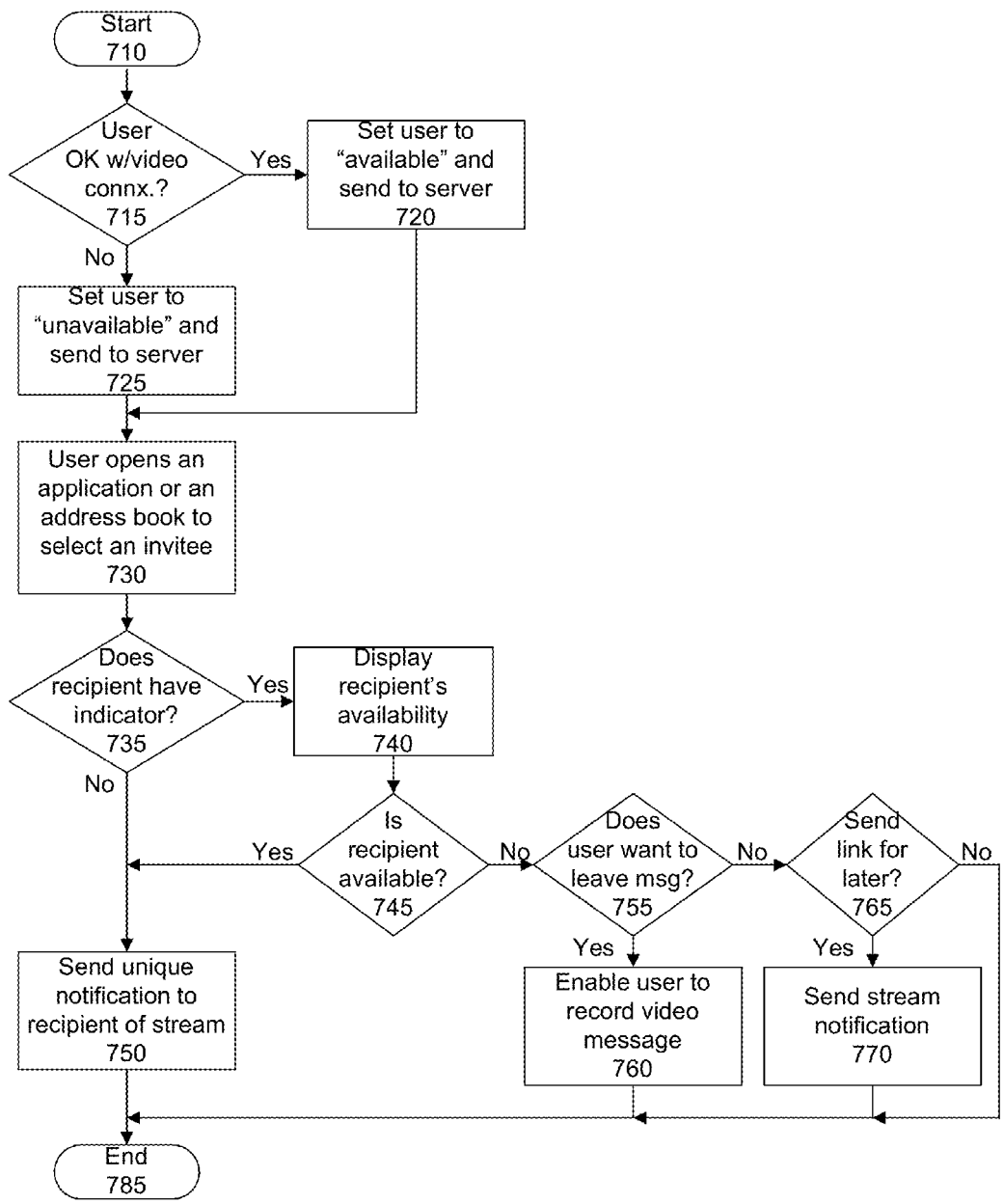
FIG. 7A is a flowchart of one embodiment of initiating a connection.

FIG. 7A is a flowchart of one embodiment of initiating a connection. The process starts at block 710. At block 715, the user sets whether he or she is available for a video connection. In one embodiment, the user has the ability to change this setting any time. The user can be set to available, at block 720 or unavailable at block 725. While this is a flowchart, as noted above, this does not imply that the step must occur ahead of other steps in the flowchart, or that it must occur at all. In one embodiment, the system default may be set to make the user available.

Figure 7C:
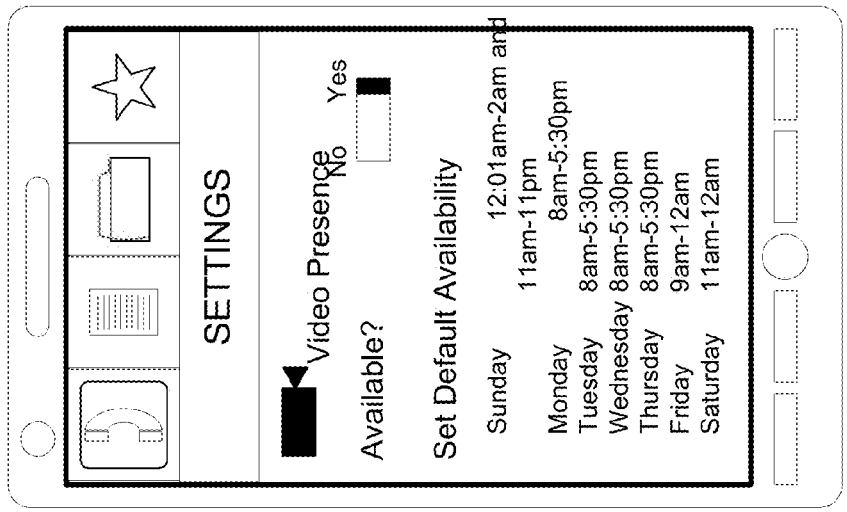
FIGS. 7B and 7C are exemplary screen shots associated with initiating a connection.
Figure 7B:
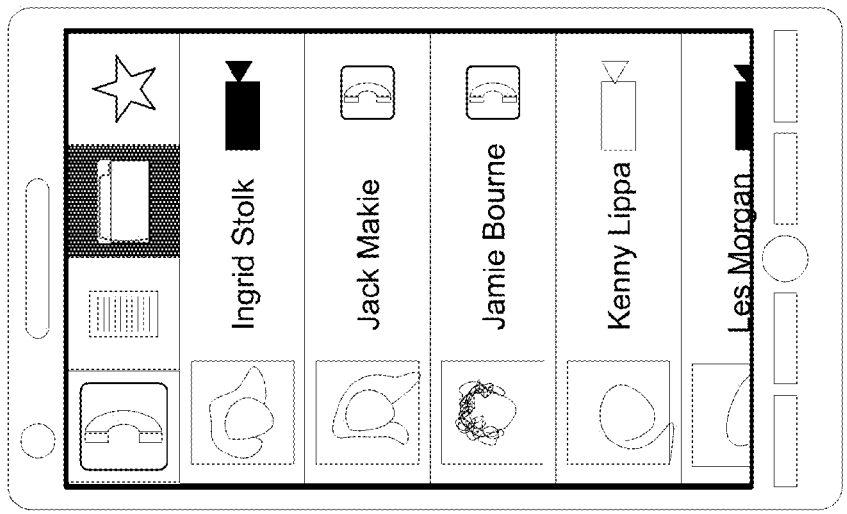

At block 730, the user selects one or more invitees for a stream. In one embodiment, this is done by selecting one or more recipients from an address book. FIG. 7B illustrates an exemplary address book.

At block 735, the process determines whether the recipient has an indicator. As shown in FIG. 7B, in one embodiment an indicator shows whether the recipient has video capability, and if the user does have video capability, whether the video capability is turned on. In one embodiment, the address book checks with the server to determine the availability of the user's video status. The status may be selected from the group of: available, unavailable, busy, no video capability, in one embodiment. In one embodiment, the video status may be a part of a user network presence setting. In one embodiment, for example, the user may be marked as busy if the user is on another call, or using another function on a device with which the video streaming system is integrated. In one embodiment, this information is available only for invitees who have previously had a video interaction with the user's system. If no such information is available, the system will attempt to connect, by sending a unique notification to recipient of a stream, at block 750. The process then ends 785.

If the data is available, at block 740, the recipient's availability status is displayed in the address listing. The status may be one of: no video ability, video reception turned off, video reception on.

At block 745, the process determines whether the recipient is indicated as available. In one embodiment, users may manually set themselves as available or not available, as shown in FIG. 7C. In one embodiment, users may set themselves available or not available based on a date and time, also shown in FIG. 7C. Other ways of setting availability may also be used—e.g. based on an external calendar such as Outlook, based on various triggers, etc.

If the user is marked as available, the process continues to block 750 to send the unique notification to the invitee. The process then ends at block 785. In another embodiment, only users who are shown as available and capable of receiving video data may be selected as recipients.

If the recipient is not indicated as available, the process continues to block 755. At block 755, the process determines whether the user wants to leave a message. In another embodiment, the stream initiator may attempt to initiate the stream even if the recipient is indicated as unavailable. In that case, the unique notification is sent, at block 750.

If the user chooses to leave a message, at block 755, the user can record a video message, at block 760. The video message may be sent directly to an MMS mailbox, or as a stream notification, as described above. The process then ends at block 785.

If the user does not want to leave a message, he or she may optionally send a link the stream to the invitee, for later replay, at block 765. That is, a link may be sent to the invitee after the stream is completed to enable them to watch the replay of the stream, at block 770. The process then ends at block 785.

Figure 8:
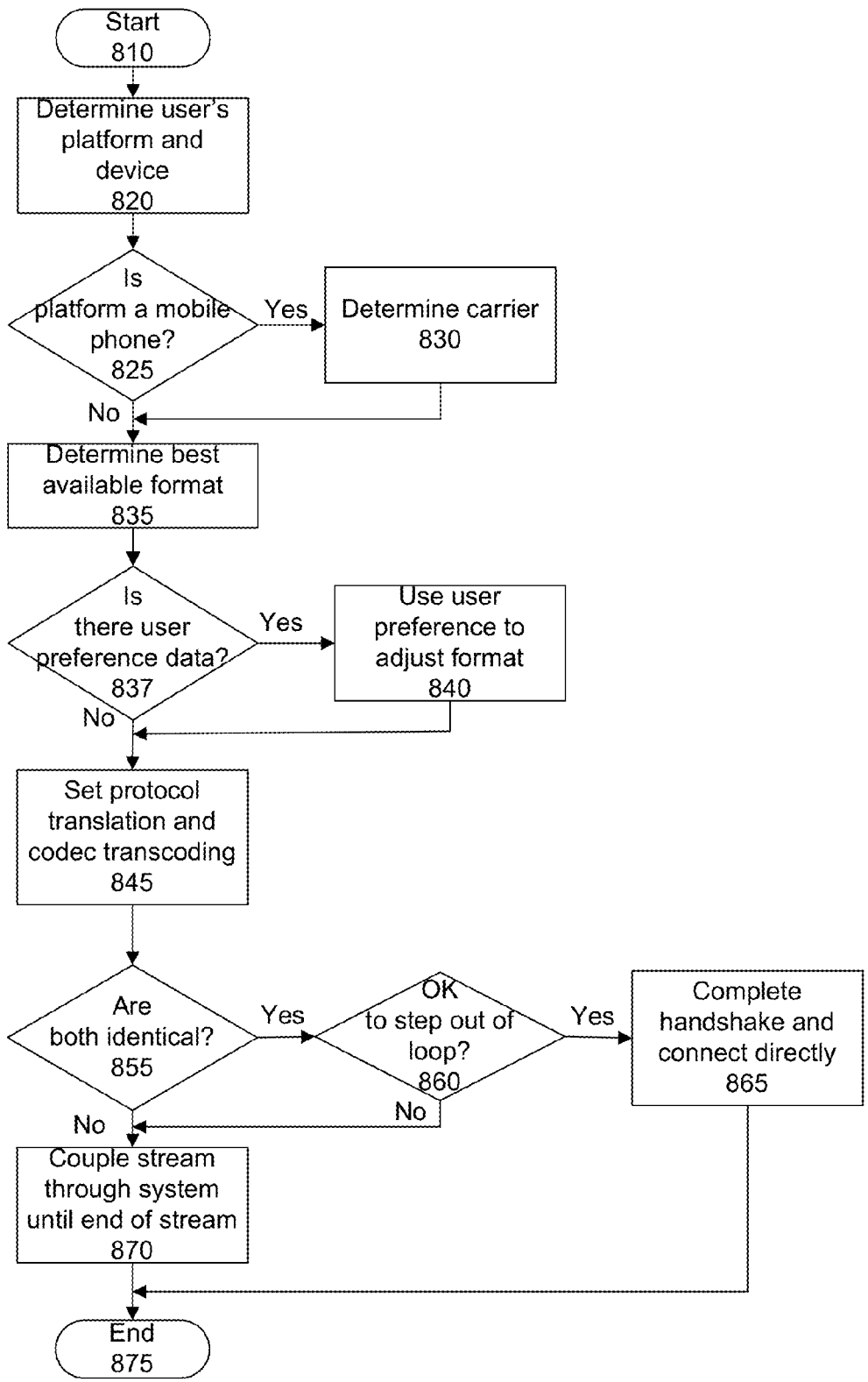
FIG. 8 is a flowchart of one embodiment of on-the-fly adjustment of the data based on the connecting user.

FIG. 8 is a flowchart of one embodiment of on-the-fly adjustment of the data based on the information of the invitee. The process starts at block 810. This process starts, in one embodiment, when an invitee clicks on an invitation to connect to a stream.

At block 820, the process determines the user's platform and device. The platform is defined, in one embodiment, as the hardware architecture or software framework is used by the video software. In one embodiment, platforms may include cellular network carriers, voice over Internet services, plain old telephone systems (POTS), and/or other video-enabled network communication platforms. The device may be the particular cell phone, VoIP device, or other recipient device that is being used. In one embodiment, the user's platform and device is determined based on the connection established when the invitee clicks on an invitation link.

At block 825, the process determines whether the platform is a mobile phone. If so, at block 830, the cellular carrier is identified. This is because different carriers have different networks, and transmission constraints. The process then continues to block 835. If the platform is not a mobile phone, the process continues directly to block 835.

At block 835, the best available format is determined. In one embodiment, the best available format depends on the formats supported by the device and the bandwidth available to the device. These are determined as noted above based on the platform, carrier, device, and other available data. In one embodiment, a bandwidth determination may be made when establishing a connection. In one embodiment, the best available format may also depend on the subscriber status of the invitee. In one embodiment, for example, certain subscribers get a better quality video, when available.

At block 837, the process determines whether there is user preference data. In one embodiment, when using an application the user may set video preferences. In general, these preferences would downgrade the maximum available bandwidth, resolution, or would alter the video format. If the user has a preference, at block 840 it is used to adjust the format, if needed. The process then continues to block 845. If no user preference data is available, the process continues directly to block 845.

At block 845, the process sets the connection and stream formats. In one embodiment, the stream format includes the network protocol at the protocol level, and the codec at the video application level. These two aspects define the video formatting as well as the frame rate, resolution, and image size.

At block 855, the process determines whether the protocol and codec are identical. This determines whether the format being sent by the streamer and the format in which it is sent on to the recipient are the same. As noted above, in one embodiment this includes video formatting as well as frame rate, resolution, and image size.

In one embodiment, if the formats are identical, the process determines at block 860 whether the intermediary system can step out of the connection, leaving the direct coupling of the streamer and the recipient. If it is acceptable, the handshake is completed, and the direct connection is established at block 865. The process then ends at block 875.

If it is not OK to step out of the loop, as determined at block 860, the process continues to block 870. At block 870, the system couples the stream through a translation to translate the originating video into the appropriate selected format for the recipient. The process ends at block 875 when the stream is terminated.

If the formats were determined not to be identical at block 855, the process continues to block 870, and the system couples the stream through translation. The process ends at block 875 when the stream is terminated.

Figure 9:
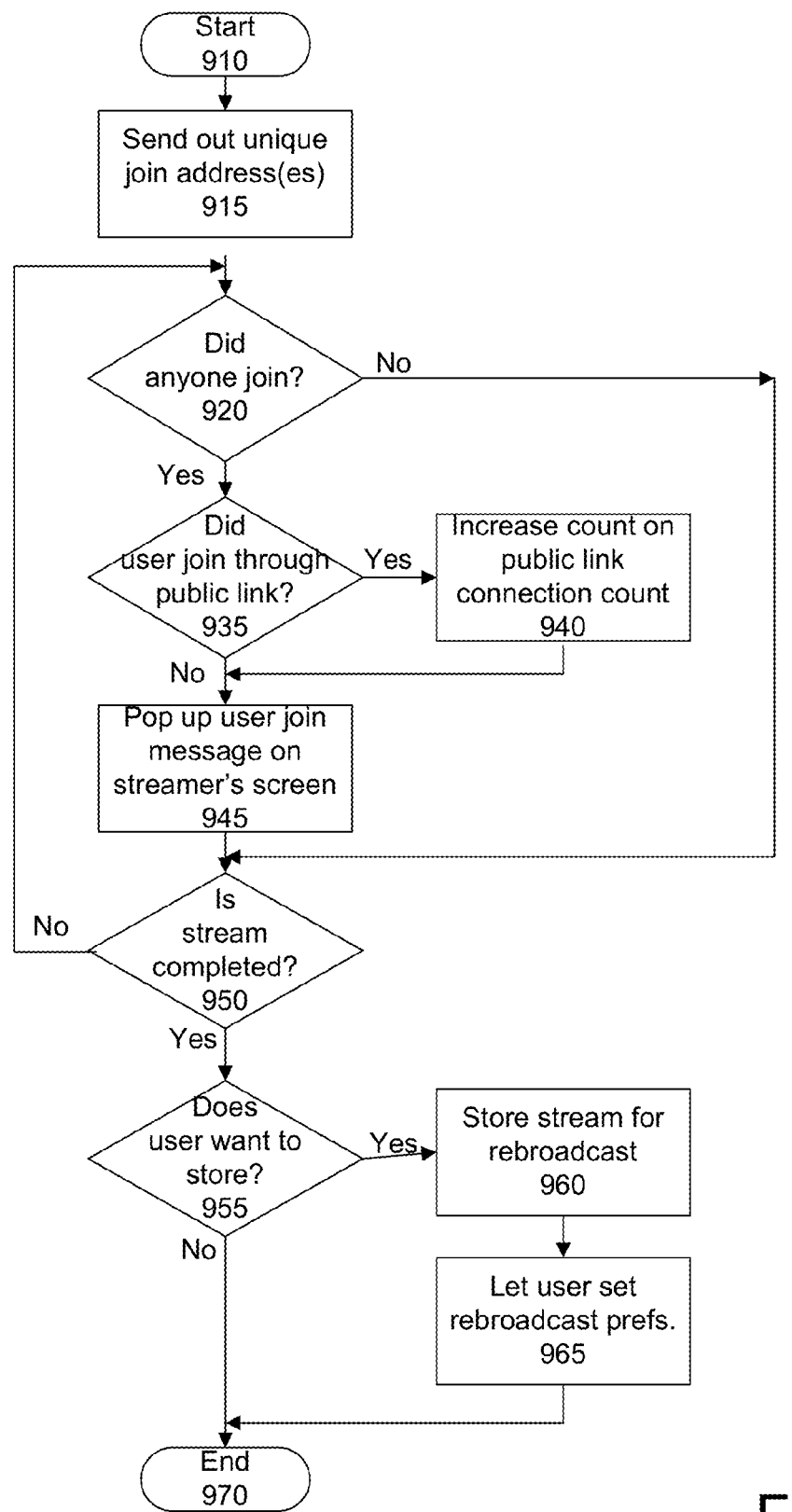
FIG. 9 is one embodiment of providing notifications to the streamer.

FIG. 9 is a flowchart of one embodiment of providing notifications to the streamer. The process starts at block 910. At block 915, unique join address(es) are sent out. As noted above, the streamer may choose one or more individuals, social networks, or public post locations to send the join address. Each join address sent out is unique, and trackable.

At block 920, the process determines whether anyone joined the stream. If no one has joined the stream, the process continues to block 950 to determine whether the stream has ended. If the stream has not yet ended, the process returns to block 920 to continue testing whether someone has joined the stream. In one embodiment, the stream may time out, in which case the stream would be marked as completed, at block 950.

If someone has joined the stream, the process determines at block 935 whether the user joined through a public link. A public link is a link posted at a social network or other site available to more than one person. A public posting link may be an invitation which is posed at a social network such as Facebook or Twitter, or another public forum such as a blog or newspaper website, etc.

If the user joined through a public link, the process continues to block 940. At block 940, the public link connection count of viewers is incremented. The process then continues to block 945. If the user did not join through a public link the process continues directly to block 945.

Figure 12A:
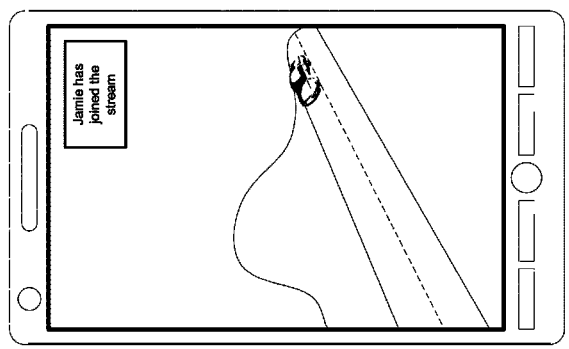
FIGS. 12A-12C are exemplary screen shots of embodiments of communication between users engaged in video communication.
Figure 12B:
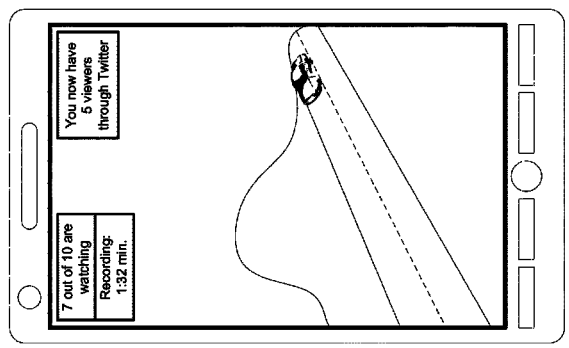
Figure 12C:
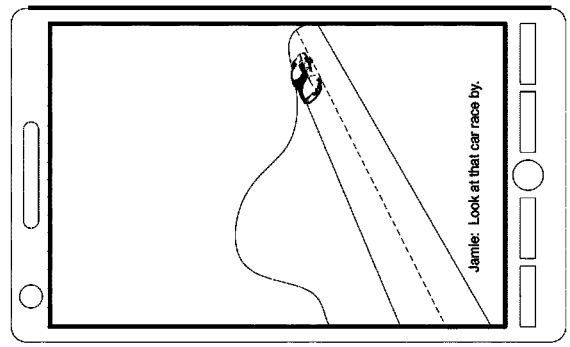

At block 945, a message indicating that an invitee has joined the stream is displayed to the streamer. If the join is through the public post, the updated count of viewers that are connected is displayed. If the join is through a unique private message (e.g. an SMS directed to the user), the name of the user who joined is displayed. FIG. 12A displays an example of a name being shown, to indicate a user has joined. FIG. 12B an example of the viewer count indication. In one embodiment, this display may be a pop-up display shown to the user for a few seconds. In another embodiment, the display may be shown continuously. In one embodiment, the display may be on an inactive portion of the screen. In another embodiment, the display may be overlaid on an active portion of the screen.

At block 950, the process determines whether the stream is completed. If not, the process returns to block 920, to continue monitoring whether someone has joined.

In one embodiment, if the user only invited individual invitees, e.g. without any public links, once those invitees have all joined the process stops monitoring for new users.

In one embodiment, the process also provides notification if an invitee disconnects from the stream. For example, the notification may show a decremented count of viewers, or may state, "Janie has disconnected."

Once the stream is completed, the process continues to block 955. At block 955, the process determines whether the video is flagged as available for rebroadcast. If so, the stream is stored, at block 960. The process, at block 965, permits the user to set rebroadcast preferences. In one embodiment, the user may set default rebroadcast preferences that may be altered on a per video basis. In one embodiment, as discussed in more detail below, the user may be prohibited from permitting rebroadcast. In one embodiment, the rebroadcast preferences may be set before the stream is started.

The process then ends, at block 970. If the user chose not to store the stream, the process continues directly to block 970, and ends.

Figure 10:
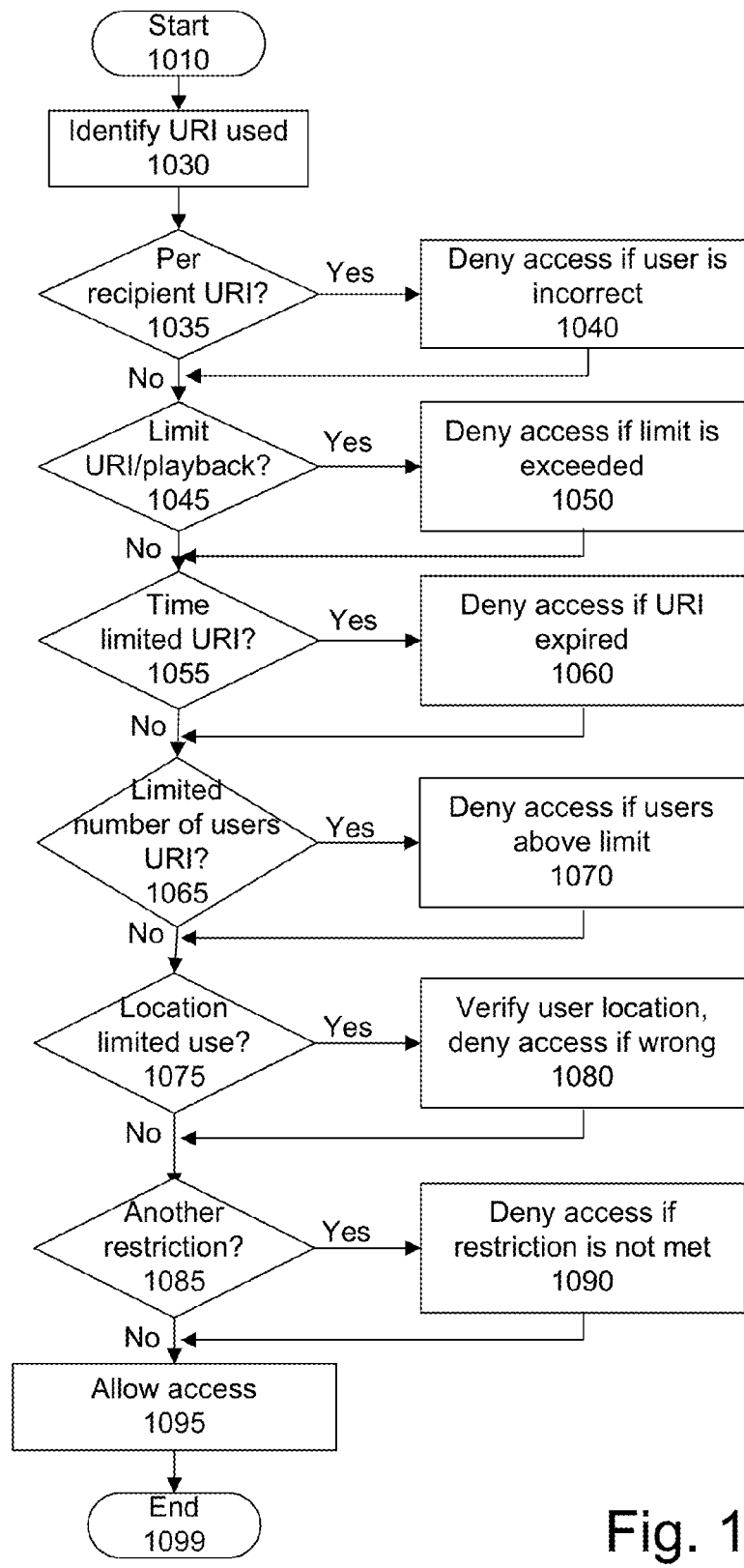
FIG. 10 is a flowchart of one embodiment of security management.

FIG. 10 is a flowchart of one embodiment of security management. The process starts at block 1010. The process starts when an invitee clicks on a link to join a stream. In one embodiment, a subset of the below security validations may be available.

At block 1030, the URI (universal resource indicator) is identified. As noted above each invitee/location receives a unique URL/URI, in one embodiment. The public posting has a unique URI to that public posting, thus for example if the user posts the stream on the CNN site, and on FACEBOOK™, separate public posting URIs are generated for those two posts.

At block 1035, the process determines whether the URI is a recipient directed URI, e.g. not a pubic post. If so, the process continues to block 1040. At block 1040, the process determines whether the join request was received from the user associated with the URI. Access is denied if the user is not the one specified as the invitee. In one embodiment, the invitation may specify the invitee by name, telephone number, device identifier, or other means. In one embodiment, if a particular device identifier is used (e.g. a telephone number associated with a cellular phone, a Skype ID, etc.) then only that path can be used to connect to the stream. In one embodiment if a user with multiple identifiers is invited, any of the paths associated with the user may be used. For example, an invitation may be received by the user on their mobile phone, their Skype account, and in their email inbox.

If the user's not denied access for not being associated with the invitation, the process continues to block 1045. Once access is denied, the rest of the checks described below do not take place.

At block 1045, the process determines whether the URI is a limited use URI. The limited use of the URI may be a limited number of users concurrently accessing the stream with the URI, a single use URI, or a limited number of playbacks with the URI. A single use URI is only valid for a single connection to the stream. This prevents rebroadcast connections, as well as the ability to use a forwarded URI. If the URI is a limited use URI, at block 1050 the process determines whether the limits on the URI have been met, and if so denies access to the stream. If the URI is not a limited use URI, or if this is within the limits of the limited use URI, the process continues to block 1055.

At block 1055, the process determines whether the URI is a time-limited URI. A time-limited URI is only available for a set period. Again, this constrains rebroadcast, and may prevent someone from joining a stream beyond a certain point. If it is a time limited URI, at block 1060 the process determines whether the time has passed. If not, the process continues to block 1065.

At block 1065, the process determines whether the public link has a limited number of users permitted. In one embodiment, this is only done for public links, since personal links by definition are designed for a single user. If it does, at block 1070 the process verifies whether the maximum number of users is connected to the stream. If not, the process continues to block 1075.

At block 1075, the process determines whether the stream is location restricted. In one embodiment, a stream may be location restricted—e.g. only users in a particular area are permitted to view the stream, or users in a particular area are not permitted to view the stream. If the stream is location restricted, the process at block 1080 determines whether the viewer is in the correct location. If so, the process continues to block 1085. Otherwise, the user is blocked.

At block 1085, the process determines whether there is another restriction on the stream. If so, at block 1090, it is verified that the invitee meets the restriction specified. If so, access is allowed at block 1095. The process then ends at block 1099. In this way, the streamer, and in one embodiment the carrier or application may put restrictions on the invitation provided. The process provides security by restricting access to the stream in accordance with the streamer's preferences. For example, the security process enables sending out links to an in-house presentation at a corporation without risking others being able to view the video.

Figure 11:
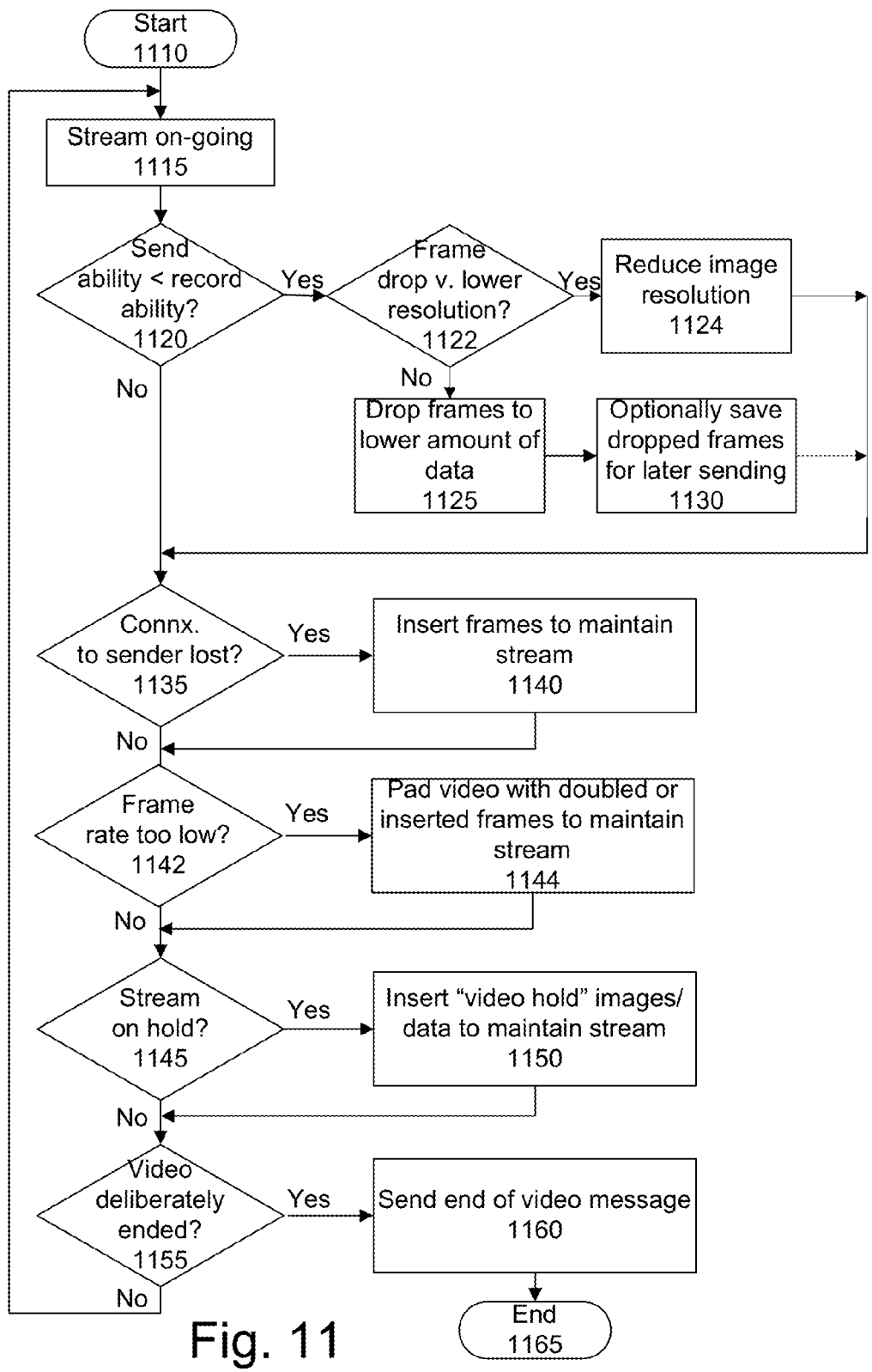
FIG. 11 is a flowchart of one embodiment of handling variable bandwidth issues.

FIG. 11 is a flowchart of one embodiment of handling variable bandwidth issues. Variable bandwidth issues are common with mobile phones, especially as users travel and thus are switched between cellular towers, or as others connect to the same cellular tower. However, having jerky or interrupted streams is problematic for viewers, and dropping calls can be a big problem. This process starts at block 1110. At block 1115 there is an on-going stream being sent to one or more recipients.

At block 1120, the process determines whether the streamer's ability to record video is higher than the bandwidth available to send the video. If so, the process continues to block 1122. At block 1120, the process determines whether image resolution can be reduced. In one embodiment, the choice whether to reduce the image resolution or to drop frames is made at block 1122. In one embodiment, the decision is made based on the current frame rate and resolution. In one embodiment, the decision is made based on what is more efficient for the device. In one embodiment, a combination of evaluations is used to select a process that is least likely to reduce the user experience. For example, if the current stream is at a 60 frames per second rate, it is likely that dropping every $5^{th}$ frame will have minimal effect on a viewer's experience. Similarly, if the stream is high definition but viewers are seeing it on a small handheld device, reducing the resolution is unlikely to have an effect on the viewing experience.

If image resolution reduction is selected, at block 1124 the image resolution is reduced.

If frame dropping is selected, at block 1125 frames are dropped to lower the amount of data for transmission. At block 1130, optionally the dropped frames are saved, for later sending. This is useful if the stream is going to be saved for rebroadcast, as it improves the rebroadcast quality that is not bandwidth limited on the sender's side. In one embodiment, the saved frames are sent when the user chooses to store the stream for optional rebroadcast.

The process then continues to block 1135.

At block 1135, the process determines whether the connection to the streamer has been lost. Occasionally, especially for users travelling while sending their video, the connection between the streamer's system and the video system may be lost. If the connection is lost, the process continues to block 1140. At block 1140, the system automatically inserts placeholder frames to maintain the video connection. In one embodiment, for a longer interruption a "video will resume" notice may be used. In one embodiment for an interruption lasting only one or two frames, blank or repeat frames may be used. The insertion of frames ensures that the stream to the recipients is continuous. Many video receivers will terminate a connection when no further frames are received. Thus by automatically inserting frames, the system can ensure that the stream is not disconnected, even if the streamer is temporarily unavailable.

At block 1142, the process determines whether the send frame rate is too low. The frame rate quality is too low if the video being received from the streamer would not display well on a recipient's device. If so, the process continues to block 1144. At block 1144, the video is padded to add additional frames. In one embodiment, the padding may be duplicating of frames, or other padding effects. In one embodiment, this may be done on a per-recipient basis.

At block 1145, the process determines whether the streamer has put the stream on hold. In one embodiment, a streamer may pause the stream. This can be useful, for example, if someone comes into the space where the stream is occurring, or the streamer does not wish to show something. If the streamer puts the stream on hold, at block 1150, a "video hold" images/video/data is inserted to maintain the stream. In one embodiment, the streamer may define the images/video/data displayed during a video hold.

At block 1155, the process determines whether the stream has been deliberately ended. In one embodiment, this occurs when the streamer terminates the video by clicking a particular button or taking another action that unambiguously indicates that the stream is terminated. In one embodiment, this may occur if the stream is stopped for more than a preset time. If the video is ended, at block 1160 an end of video message is inserted into the stream and displayed to the invitee. In one embodiment, the end of video message may be defined by the streamer. In one embodiment, the end of video message may be a viral marketing tool to suggest to the invitees that they acquire the application or subscribe to the services provided. Other data, including advertising, logos, etc. may also be inserted. The process then ends at block 1165.

Note that although this is described as a flowchart, each of these decision points may be separately evaluated at any time. In one embodiment, triggers for each of these evaluations are active while a stream is active. However, no "queries" are made, in one embodiment. Rather the system monitors the stream and determines if one of the conditions indicated by a decision point has occurred.

Figure 13:
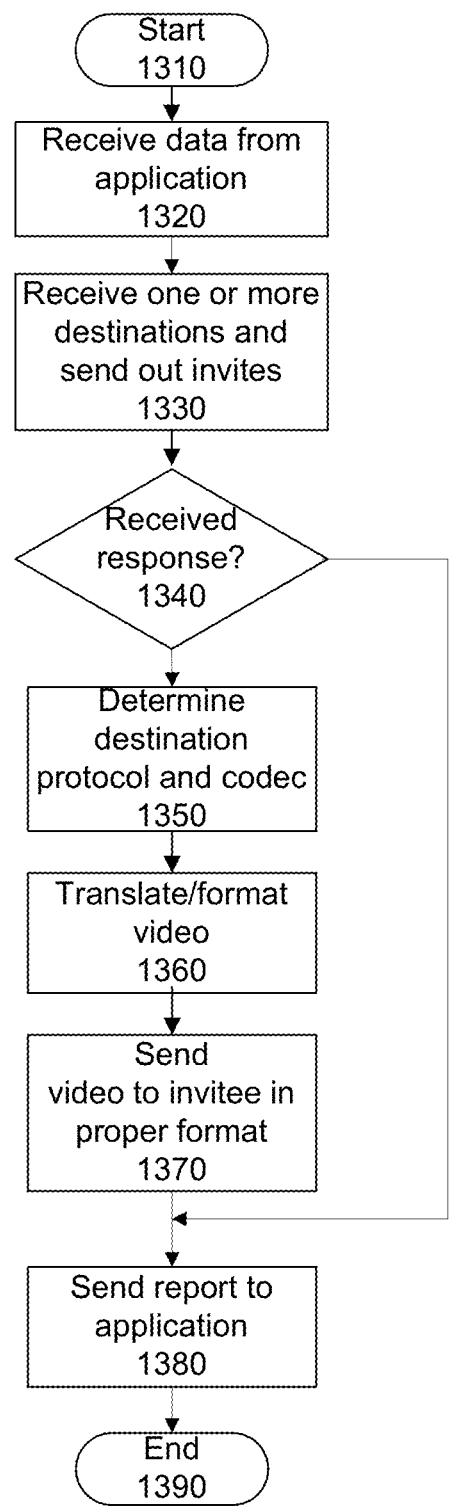
FIG. 13 is a flowchart of one embodiment, of using the hub to provide video services to for application.

FIG. 13 is a flowchart of one embodiment, of using the hub to provide video services to an application. An application may be an enterprise application, or an existing mobile application that does not have integrated video streaming capability. The process starts at block 1310. In one embodiment, this process is activated when an application is linked into the video hub. The video hub provides services to applications to enable an application to utilize video capabilities.

At block 1320, video data is received from the application.

At block 1330, one or more destinations are received, and the system sends out invitations to the designated recipients.

At block 1340, the process determines whether there have been one or more responses received. In one embodiment, each response is handled separately as described below.

At block 1350, the network protocol and the codec appropriate to the user who has responded to the invitation is selected.

At block 1360, the video is formatted to the protocol and codec, based on the selected protocol and codec. In one embodiment, while the phrases "translate the video" or "receive video" are used, this process may be used with streaming video, such that the translation occurs continuously through the video, as is transmission either back to the application or to the destination.

At block 1370, the video is streamed to the invitee in the proper format.

At block 1380, a report is sent to the application, and the process then ends at block 1390. If at block 1340 no response is received, the process continues directly to block 1380 to report to the application.

Figure 14:
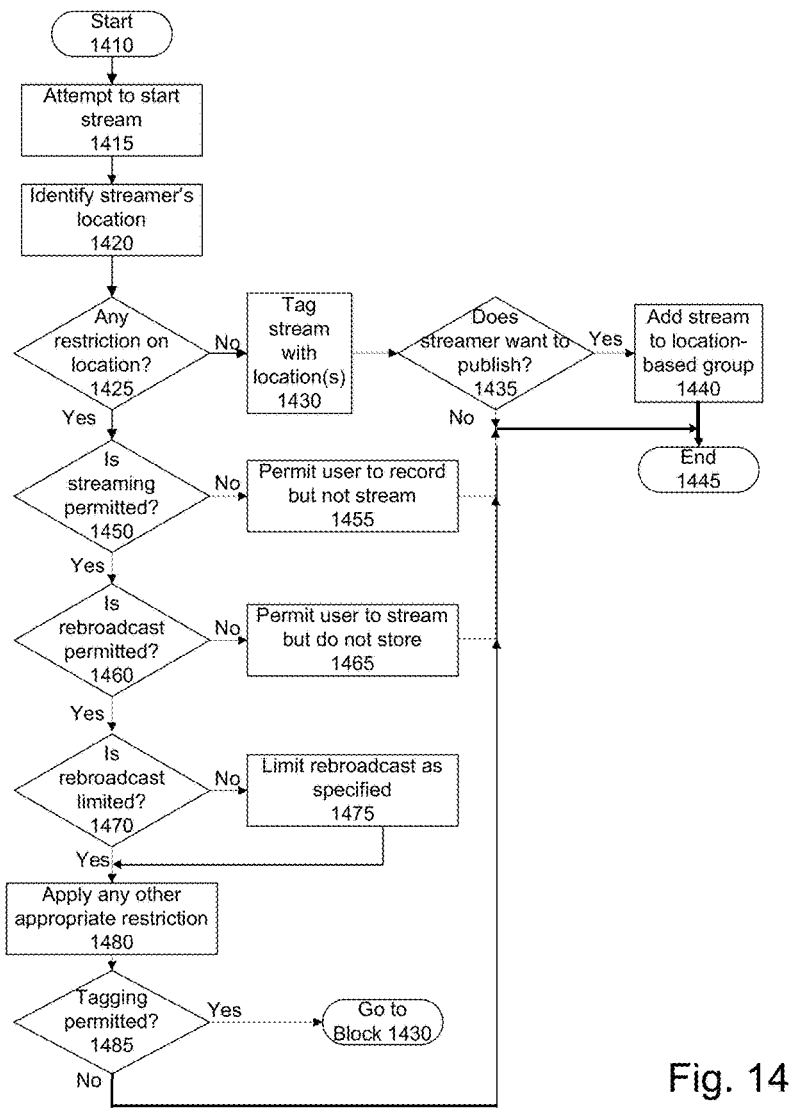
FIG. 14 is a flowchart of one embodiment of location-based controls on streaming.

FIG. 14 is a flowchart of one embodiment of location-based controls on streaming. In one embodiment, the system may restrict streaming by location. For example, at movie theaters or live performances, streaming may be prohibited. In one embodiment, the present system may enforce these restrictions based on the location of the streamer.

At block 1415, the user attempts to start streaming. At block 1420, the streamer's location is identified. In one embodiment, the streamer's location may be identified based on global positioning system (GPS) signals, wireless network signals, cellular network triangulation, a combination of the above, or in another way.

At block 1425, the process determines whether there are any restrictions on location. If there are no restrictions on the location, the process continues to block 1430. At block 1430, the stream is tagged with the location. At block 1435, the process determines whether the streamer wishes to publish the stream. Publishing a stream means the stream is made available for public rebroadcast. If so, the stream is added to a location based group, at block 1440. This enables potential viewers to find the stream based on the location.

In one embodiment, the user may choose "limited publication" of the video. The stream would be added to the location-based group, but would not necessarily be visible to all searchers. For example, the video access may be limited to logged-in users, or to a particular set of users or destinations. In one embodiment, the standard limitations may remain on the video, even though it is "published" and added to the location-based group.

The process then ends at block 1445. In one embodiment, the streamer's location is continuously monitored and if the streamer moves, or the restrictions change, the process is re-executed.

If at block 1425 it was found that there are restrictions on the location, the process continues to block 1450. At block 1450, the process determines whether streaming is permitted. If streaming is not permitted, at block 1455, the user is informed of the prohibition against streaming. In one embodiment, the user is permitted to record the data, but not stream. The process then ends at block 1445.

If streaming is permitted, the process continues to block 1460. At block 1460, the process determines whether rebroadcast is permitted. In one embodiment, the restriction may be the permission of live streams but the prohibition of recordings that can be played later. The present system enables the permission of a live stream, while prohibiting recordings. If rebroadcast is not permitted, the user is permitted to stream, but not store the data, at block 1465. In one embodiment, the invitations sent may be modified to be time limited, available only during the stream. The process then ends at block 1435.

At block 1470, the process determines whether the rebroadcast is limited. If so, at block 1475, rebroadcast is limited as specified.

At block 1480, the process applies any other appropriate restrictions. These restrictions may include for example a limited number of viewers, or viewers only in a particular geographic location, stream only of a particular quality, streams only of a particular length, etc. All restrictions on the stream may be applied. In one embodiment, these restrictions may be enforced at the server level. In another embodiment, these restrictions may be enforced by the application itself. In one embodiment, the user may be informed of the restriction. In another embodiment, the user may simply be unable to perform a non-permitted action.

At block 1485, the process determines whether tagging is permitted. If so, the process continues to block 1430, to enable the user to tag the stream. If not, the process ends, at block 1445.

FIG. 14 provides exemplary restrictions that may be applied to a stream based on a location. In one embodiment, other restrictions may be applied based on other definable characteristics of the recording. For example, based on time, weather, or any other characteristic that can be conclusively determined.

Figure 15:
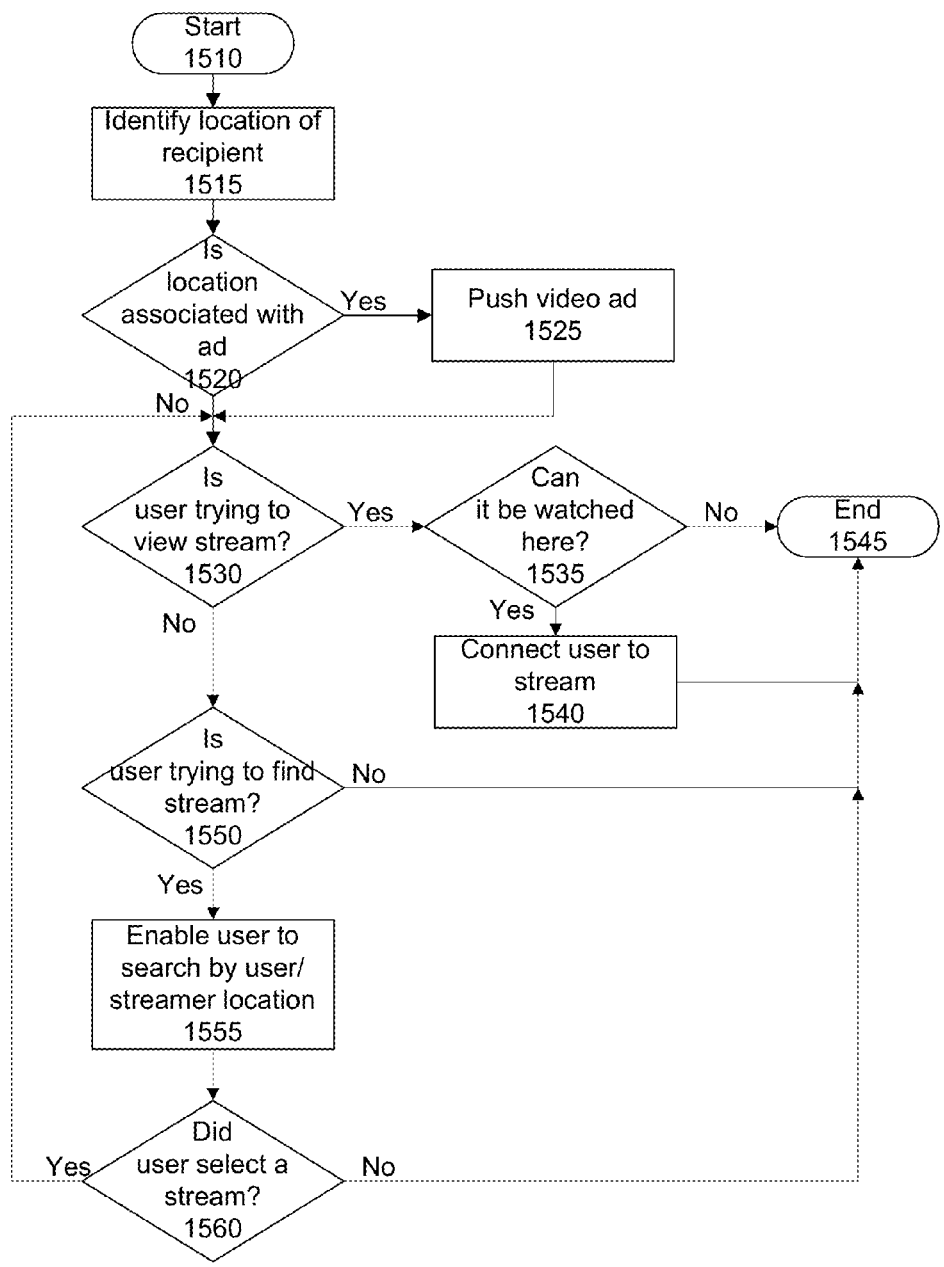
FIG. 15 is a flowchart of one embodiment of location-based controls on receiving a stream.

FIG. 15 is a flowchart of one embodiment of location-based controls on receiving a stream. The process starts at block 1510.

At block 1515, the location of the recipient is identified. In one embodiment, if the recipient is using a computing device, the network address is used. For a mobile telephone, network triangulation and/or GPS may be used. Other ways of determining location may also be utilized.

At block 1520, the process determines whether the location is associated with advertisement. In one embodiment, the system can push video ads, based on the viewer's location. In one embodiment, this may be done independently of whether the user has attempted to connect to a stream, or has activated the video application. In one embodiment the video ad is pushed, at block 1525, and activated either live or the next time the user interacts with the video system. In one embodiment, the user's profile may select which video ads to push or stream to the user's system. In one embodiment, only those video ads that are location-appropriate and viewer-appropriate are sent.

At block 1530, the process determines whether the user is trying to view a stream. If so, at block 1535, the process determines whether the stream can be viewed at the recipient's location. If so, the user is connected to the stream at block 1540. Otherwise, the process ends at block 1545.

If the user is trying to find a stream, at block 1550, in one embodiment, the user can search by the user's own location or by the streamer's location at block 1555. If the user selects a stream, as determined at block 1560, the process returns to block 1530 to evaluate permissions associated with the selected stream.

In one embodiment, as with restrictions on the streamer, restrictions on the recipient may also be based on things other than location, such as time of day, recipient's activity, weather, etc.

Figure 16:
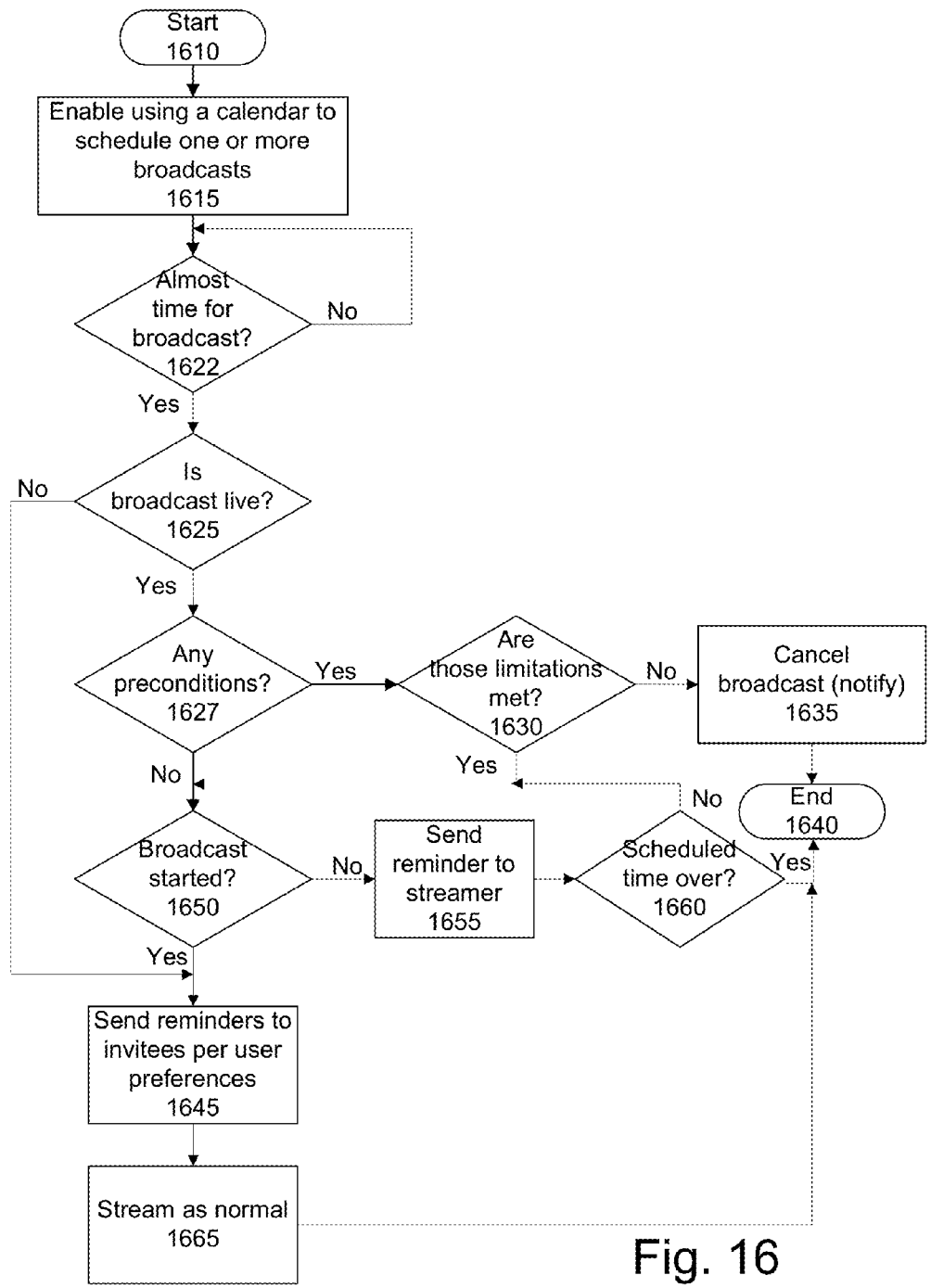
FIG. 16 is a flowchart of one embodiment of scheduling a broadcast including reminders.

FIG. 16 is a flowchart of one embodiment of scheduling a broadcast including reminders. In one embodiment, scheduling is a feature provided to all users. In another embodiment, the ability to provide scheduling is provided to subscribers or premier users only. The process starts at block 1610.

At block 1615, the ability to schedule one or more broadcasts is provided to the users. In one embodiment, the schedule may include live broadcasts as well as rebroadcasts of prior material. The prior material need not be material generated through the video system described herein.

At block 1622, the process waits until it is almost time for a broadcast. In one embodiment, the user may set the time at which this process starts. In one embodiment, the default is to have this process occur five minutes before the start of the broadcast.

At block 1625, the process determines whether the broadcast is live. The broadcast may be pre-recorded or non-video data. If the broadcast is not live, the process continues directly to block 1645, to send reminders to the invitees. In one embodiment, the reminders (or lack of reminders) may be set by the user. For example, the user may set reminders five minutes, or an hour, or any other time before a broadcast. The process then continues to block 1665 to stream the information as normal. The process then ends at block 1640.

If the broadcast is live, as determined at block 1625, the process continues to block 1627. At block 1627, the process determines whether there are any preconditions for the broadcast. The preconditions for the broadcast may include the location, the presence of one or more particular individuals, a concert, etc. If those preconditions are not met, as determined at block 1630, the broadcast is cancelled, at block 1635. This can occur, for example, if someone schedules a broadcast stream of a concert at Stern Grove in San Francisco, but the streamer is located in New York at the time the broadcast is scheduled. Similarly, if the underlying concert were cancelled, the broadcast would be as well. The process then ends at block 1640.

If there are no preconditions as determined at block 1627, or all limitations are met as determined at block 1630, the process continues to block 1650.

At block 1650, the process determines whether the broadcast has started. If so, the reminders/invitations are sent, per the user preferences, at block 1645. The process then continues to stream as normal.

If the broadcast has not started, at block 1655 a reminder is sent to the streamer. The process then determines whether the scheduled time for the broadcast is over, at block 1660. If so, the process ends at block 1640. If the scheduled time is not yet over, the process returns to block 1650 to determine whether the broadcast has started yet. In one embodiment, reminders are sent to the user every five minutes, or at another interval. Reminders may become more or less frequent, as time passes.

In one embodiment, the calendar and scheduling may be used to enable a user to set up a full-time channel with video or other content related to the user. For example, a celebrity user may set up a channel on which scheduled live events are interspersed with rebroadcasts of previously recorded live events, previous movies or television shows or other appearances by the celebrity user, photo montages or other images of the user, etc. By enabling a fan to tune in any time to the celebrity's channel, the system provides something more real than "reality TV" enabling a closer connection between the celebrity and the fan.

Figure 17:
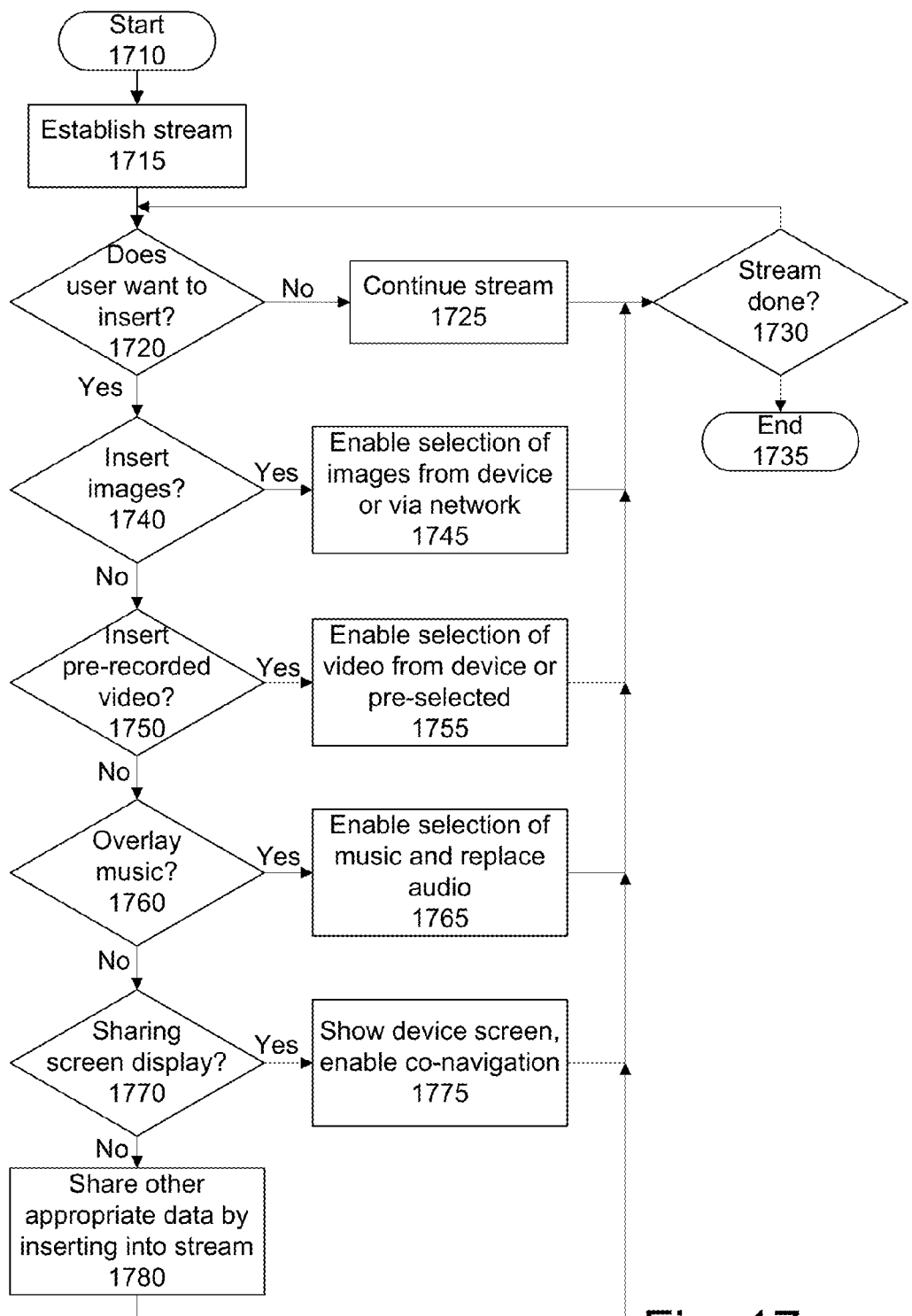
FIG. 17 is a flowchart of one embodiment of inserting non-camera-based data into the video stream.

FIG. 17 is a flowchart of one embodiment of inserting non-camera-based data into the video stream. The system enables a user who is sending a stream to send things other than the direct video. The process starts at block 1710.

At block 1715, the stream is established. This is done, in one embodiment, as described above.

At block 1720, the process determines whether the user wishes to insert something. In one embodiment, this determination is made when the user selects an option to insert into stream. If the user does not wish to insert anything, the stream is continued at block 1725. At block 1730 the process determines whether the stream is done, e.g. the streamer has terminated. If so, the process ends at block 1735. Otherwise, the process returns to block 1720 to continue monitoring whether the user wishes to insert something into the stream.

If the user does wish to insert something in to the stream, the process continues to block 1740. At block 1740, the process determines whether the user wishes to insert photographs or images. If so, at block 1745, the process enables the selection of photographs or images. In one embodiment, one or more photographs or images may be selected from the photographs or images on the user's device. In one embodiment, if multiple photographs or images are created, the system may automatically generate a slideshow with the selected photographs or images. In one embodiment, in addition to being able to select photographs or images on the local device, the user may select photographs or images available via a network connection. In one embodiment, the user may insert a preselected set of photographs or images, e.g. the user may make the selection prior to starting the stream, and then insert the pre-selected photographs or images into the stream. The process then continues to block 1730 to determine whether the stream is done.

If the user wishes to insert a pre-recorded video, as determined at block 1750, the process continues to block 1755. At block 1755, the user can select the video. As previously, in one embodiment, the user may pre-select video for insertion. For example, a user may pre-select a video "interlude" amid a live stream, and a "closing video" and these two items may be available to the user for insertion. In one embodiment, video may be from an external source. For example, a streamer may insert a prerecorded stream (or a stream received from another streamer). The process then returns to block 1730 to determine whether the stream is done.

If the user wishes to overlay music, as determined at block 1760, the process continues to block 1765. At block 1765, the process enables the user to select music from the device and replaces the audio with the music. In one embodiment, the user may choose to overlay the music (e.g. keep the original audio and layer the music on top). In one embodiment, replacing the audio track with the music is the default option. This enables the user to stream an interesting live event with appropriate music, for example the William Tell Overture for a horse race, etc. In one embodiment, the musical overlay continues until stopped by the user. In one embodiment, the musical overlay may restart the musical selection if the stream continues past its natural end. In one embodiment, the musical overlay continues until the end of the musical piece. In one embodiment, the user is informed of the upcoming end of the piece and can easily restart or make another musical selection. In one embodiment, the system may make available mood-music, e.g. music designed to reflect a mood rather than a known musical composition. The process then continues to block 1730.

If the user decides to share the screen display, as determined at block 1770, the process continues to block 1775. At block 1775, the device screen is shown in the stream. The user can then switch to another application, while maintaining the stream, and thus share the screen display. In one embodiment, the device may enable co-navigation, e.g. the recipient may return data to the screen to control the cursor and thus the display. In one embodiment, this sharing may be manually terminated by the streamer. In one embodiment, when the user returns to the video interface the sharing is automatically terminated. The process then returns to block 1730 to determine whether the streaming is still active.

If the user decides to share something else, not specified above, the appropriate data is inserted into the stream at block 1780. In one embodiment, any information available to the user may be inserted into the stream. The process then returns to block 1730, to determine whether the streaming is continuing.

In one embodiment, when the user selects "insert" option from the menu, the pre-selected items—such as pictures or videos or musical selections previously identified for insertion—are displayed. In one embodiment, the user also has the ability to select a new item, photograph, video, music, etc. for sharing.

Figure 18:
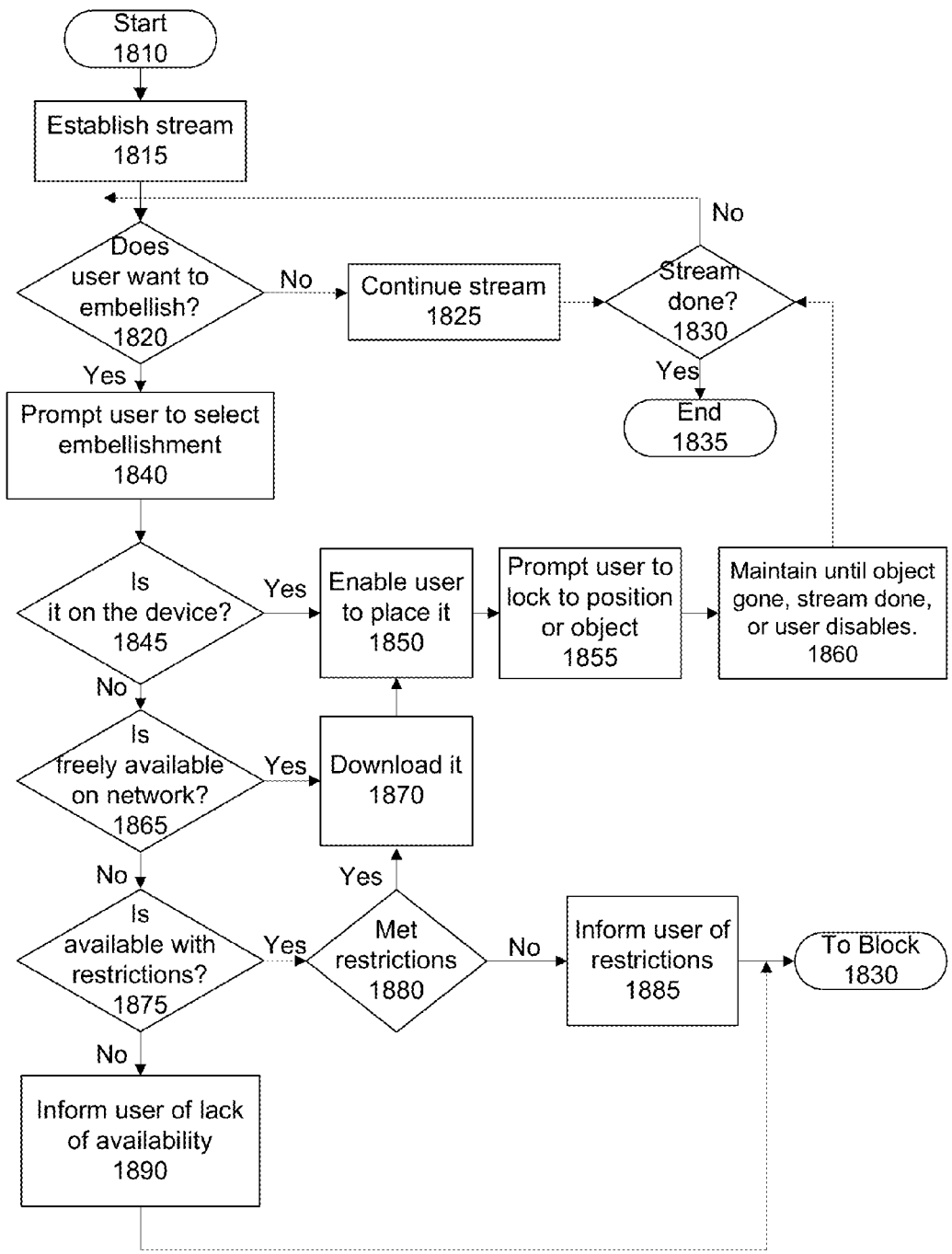
FIG. 18 is a chart of one embodiment of decorative elements that may be added into the video stream.

FIG. 18 is a chart of one embodiment of decorative elements that may be added into the video stream. These decorative elements may be whimsical such as frames, crowns, beards, or similar decorations. The decorative elements may be informative, such as a corporate logo or video title. The decorative elements may also be to block information, e.g. a blackout area over a portion of the video.

The process starts at block 1810. At block 1815, a stream is established.

At block 1820, the process determines whether the user wishes to embellish a stream. In one embodiment, the user has the opportunity to pre-set embellishment before anyone has had the opportunity to join a stream. For example, a corporate video may add the corporate logo in the corner of the image immediately.

If the user does not wish to embellish at this time, the process continues to stream at block 1825, and determines whether the stream is done at block 1830. If the stream is not yet ended, the process continues to monitor whether the user wishes to embellish the stream, at block 1820. Otherwise, the stream ends at block 1835.

If the user wishes to embellish, the process continues to block 1840.

At block 1840, the user is prompted to select an embellishment. In one embodiment, the user may select an embellishment that is not already loaded onto the device.

At block 1845, the process determines whether the selected embellishment is on the device. If so, at block 1850, the embellishment is displayed and the user may place it. In one embodiment, the embellishment is displayed in a corner of the screen, and the user may use a touch screen or mouse to position the embellishment. At block 1855, the user is prompted to lock the embellishment into position. The position may be an XY coordinate on the screen, or may be a particular person or object onto which the embellishment is locked. For example, the corporate logo may remain in the bottom right corner of the image, regardless of how the video is moved around. In contrast, a crown placed as an embellishment on someone's head should remain on the head, no matter how the video moves.

At block 1860 the system maintains the embellishment associated with the object on the object, until the stream is done, the object is no longer on screen, or the user manually disables the embellishment. In one embodiment, for location-locked embellishments, the embellishment is maintained until the user removes it. In one embodiment, of course, a user may put a timer on any establishment (e.g. maintain this logo as placed for 1 minute, etc.) The process then continues to block 1830, to determine whether the stream is done.

If the embellishment is not locally available on the user's device, at block 1865 the process determiners whether it is freely available via a network. If so, at block 1870 it is downloaded. The process then continues to block 1850 to enable the user to place the now locally available embellishment on the screen.

If the embellishment is not freely available on the network, the process at block 1875 determines whether it is available with restrictions. Restrictions for example may be location based—e.g. embellishments related to Disney Land may be only available while one is located at Disney Land, user based—e.g. only subscribers have these embellishments, purchase based—e.g. available only when purchased, membership based, etc. In another embodiment, embellishments that are restricted are not visible to the user unless he or she meets the restrictions. In that case, blocks 1875 through 1890 may be eliminated.

At block 1880, the process determines whether the user has met the restrictions. If so, the process continues to block 1870 to download the embellishment, and then to block 1850 to enable the user to place them. If the restrictions are not met, the process continues to block 1885, where the user is informed of the restrictions. In one embodiment, if the restriction is one that the user can overcome by paying money, joining a group, etc. the user may be prompted to do so. The process then continues to block 1830 to determine whether the stream is completed.

If the embellishment is not available, even with restrictions, the user is informed of a lack of availability. This may occur if the user searches for a particular embellishment via a text description, e.g. the user types in "Mickey Mouse ears." If those embellishments are simply not available, the user is informed, at block 1890. The process then continues to block 1830 to determine whether the stream is completed.

The ability to provide embellishments via membership, subscription, user identity, user profile, or location is useful as an add-on feature to monetize the present system. For example, a company may make an embellishment available to a user when the user subscribes to their newsletter, or "likes" their Facebook page, or purchases a particular object, etc. Users may also optionally purchase specific embellishments from various providers. In one embodiment, the system provides a centralized repository of embellishments. In another embodiment, the user may receive a special link or other indication for additional embellishments stored elsewhere. In one embodiment, the system enforces embellishment authenticity, e.g. prohibiting a provider who is not associated with Disney Land to offer "Mickey Mouse ears."

Figure 19:
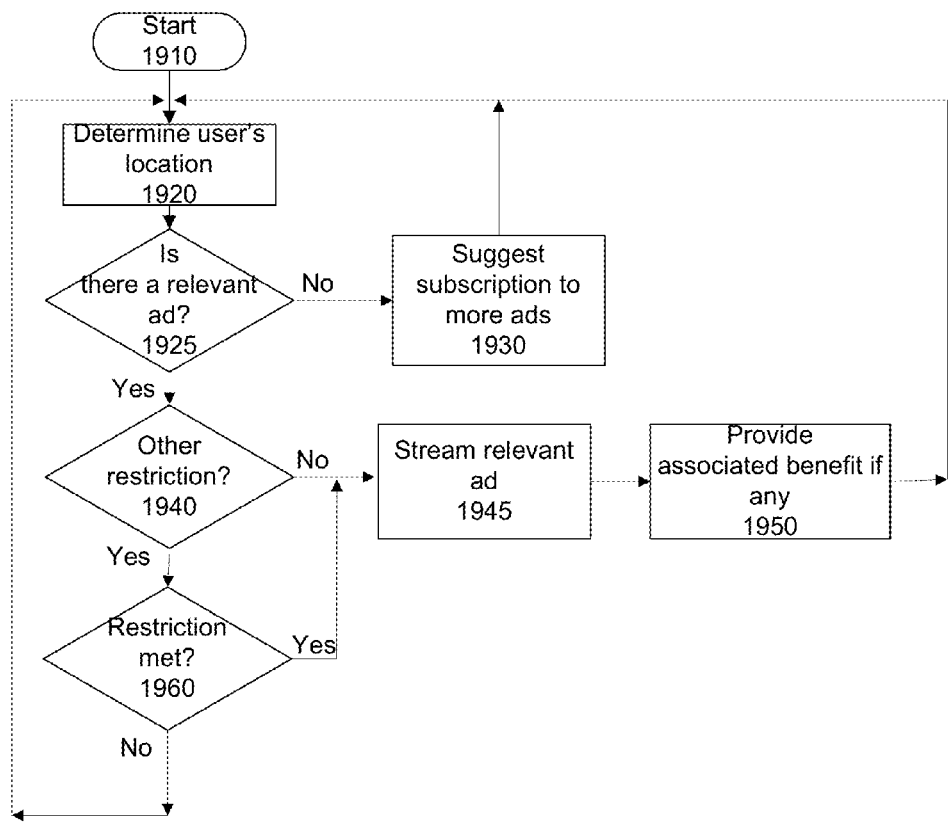
FIG. 19 is a flowchart of one embodiment of advertising features that may be used with the present invention.

FIG. 19 is a flowchart of one embodiment of advertising features that may be used with the present invention. In one embodiment, the present system enables the presentation of advertisements to users. In one embodiment, subscribing advertisers may restrict their advertising to those with a particular profile. For example, a studio releasing a G-rated movie may want to target younger children or adults with younger children for their advertising. It is unlikely that they would want to show their streaming video advertising to the 21-year-old male demographic.

In one embodiment, the user subscribes to ads. In one embodiment, ads have associated benefits. For example, if a store provides a video advertisement, they may also provide a discount to users who view the ad and then purchase their merchandise. Similarly, movie studios may provide a small discount, or free popcorn, or something equivalent for those that participate in their advertising scheme. In one embodiment, users are automatically subscribed to ads. In one embodiment, this may be a subset of ads. In one embodiment, as users add profile information, the advertising may be more targeted. The process starts at block 1910.

At block 1920, the user's location is determined. In one embodiment, many ads are location based. In one embodiment, the presence of a relevant ad is dependent on the user being in the correct location. For example, a movie theater may want to push out video previews of the movies currently running at that theater. A store might want to have a short video about the usefulness of an object it sells.

At block 1925, the process determines whether there is a relevant ad, in one embodiment based on the user's location. A relevant ad is an ad that is available to be pushed to the user—either because the user is subscribed or because it is being sent to all users. If there are no relevant ads, in one embodiment the user is periodically reminded to subscribe to ads, at block 1930.

If there is a relevant ad, the process determines whether there are any other restrictions on the ad at block 1940. As noted above these restrictions may in one embodiment include user age, user preferences, and other data derived from the user. In one embodiment, these restrictions may include other restrictions, such as number of views of an ad, effectiveness, etc.

If there are no restrictions, at block 1945 the ad is streamed to the user. At block 1950, any associated benefit is provided. The associated benefit may be a discount on the product or service associated with the service. The associated benefit may be something provided by the video streaming company, e.g. a user may receive a gift certificate or discount, etc. There may be no benefit at all.

The process then returns to block 1920, to determine the user's location again. In one embodiment, only a single ad is streamed at each location, and a subsequent ad is only selected when the user is in a different location. In another embodiment, various ads may be presented at the same location.

If there are restrictions, as determined at block 1940, the process continues to block 1960. At block 1960, the process determines whether the restrictions are met. If the restrictions are met, the process continues to block 1945 to stream the relevant ad. If the restrictions are not met, the process returns to block 1920, to determine the user's location again.

Figure 20A:
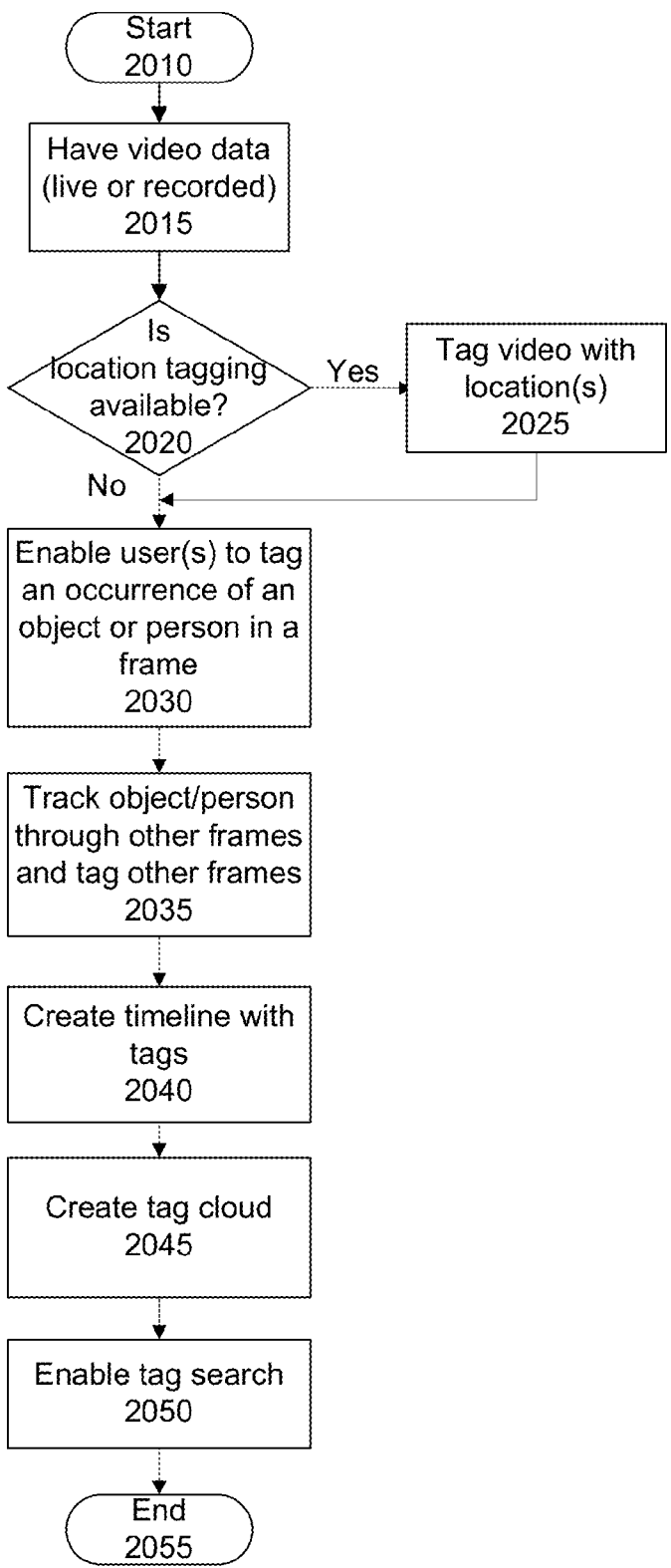
FIG. 20A is a flowchart of one embodiment tagging within the video stream.

FIG. 20A is a flowchart of one embodiment tagging within the video stream. Tagging is well known as a way of attaching searchable information to images, blog posts, articles, and other data online. The present invention, in one embodiment, enables tagging within a video.

The process starts at block 2010. At block 2015, the video data is received. The video data may be live streamed or prerecorded data. In one embodiment, the streamer, as well as recipients, may live-tag the data as it is being recorded. In one embodiment, such tags may be sent to all users, even if applied by a recipient rather than the streamer.

At block 2020, the process determines whether location tagging is available. In one embodiment, the user and/or the location may forbid location tagging. In one embodiment, the streamer may not have any location information. However, if location tagging is available, and location data is available, the video is tagged with one or more locations at block 2025. In one embodiment, each time the location changes the video is tagged with the new location.

At block 2030, users are enabled to tag an occurrence of an object or person in a frame. In a standard frame, any object may be tagged. For example, when watching a car race (see FIGS. 20B and 20C) the road, the cars, the mountains, and other individuals may be tagged.

At block 2035, in one embodiment the object/person tagged is tracked through other frames, and the tags are applied to the other frames in which that person/object is present. For example, in a video of a party, the user may tag a guest at their first appearance. The system would then attempt to follow that individual and continue to apply the tag to each frame in which that individual is present. Because a video changes very little from frame to frame, tracking an individual moving through the frames is possible. Therefore, it is possible to maintain tagging of individuals until they leave the video. In one embodiment, when the same individual appears again, the system may tentatively tag the individual, based on one or more of facial recognition, color distribution characteristics, or clothing characteristics.

Figure 20C:
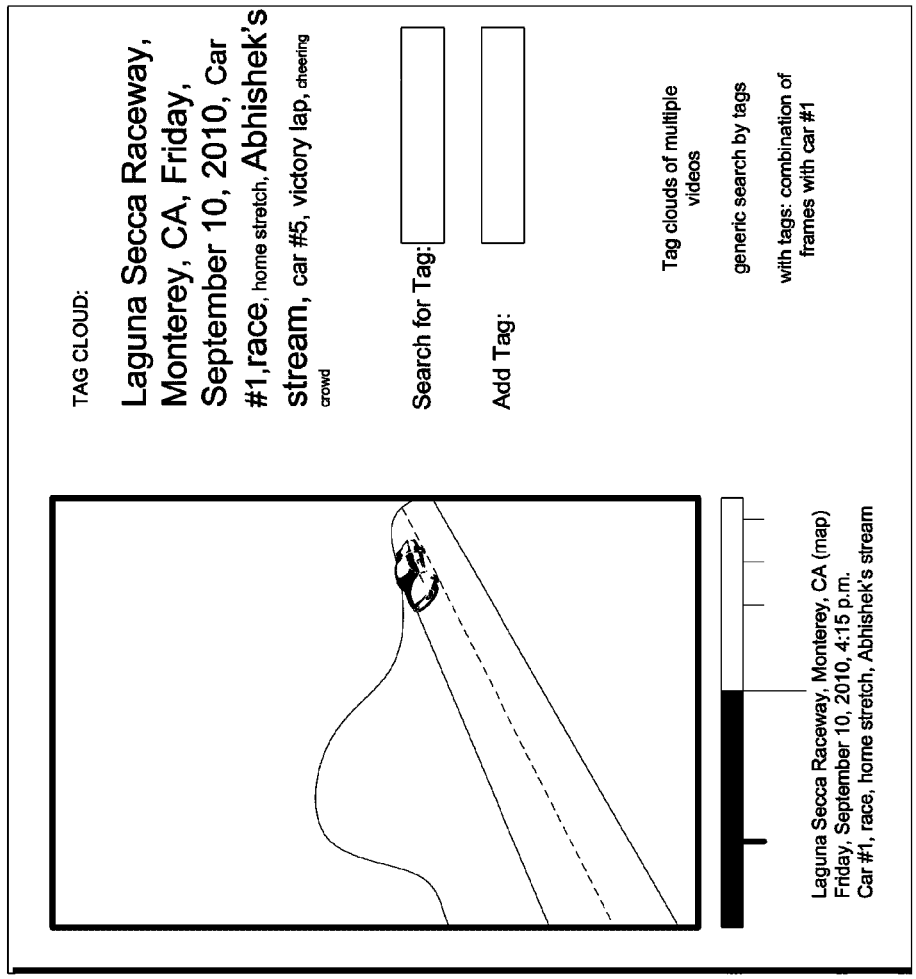
FIGS. 20B and 20C are screen shots of one embodiment of a stream including a plurality of tags.
Figure 20B:
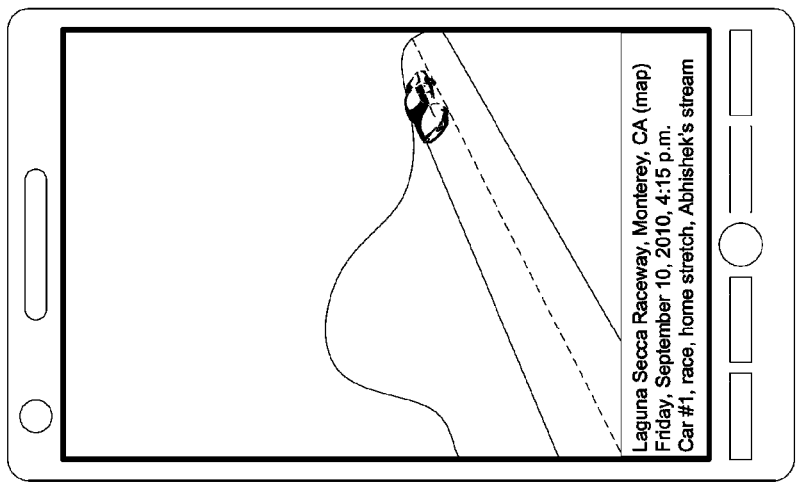

At block 2040, a timeline is created with tags. The timeline represents the tags associated with the frames at various times in the video. FIG. 20C shows one embodiment of a timeline, showing one point in the timeline (the currently displayed one) with the associated tags. In one embodiment, the user may move the controls along the timeline for pre-recorded content, and see the tags as they pop on and off the screen as items appear. This would enable someone, for example, to focus on the portions of the video that are of particular interest. It may also be used, for example, to edit a video later.

At block 2045, in one embodiment a tag cloud is created. A tag cloud is a listing of all tags associated with a video. In one embodiment, the tag cloud may show items that appear more frequently with a larger font, as in FIG. 20C. In another embodiment, the frequency of occurrence may be used to sort the tags, such that tags appearing earlier in the listing are more common. In another embodiment, tags may be sorted by color. Alternative ways of indicating frequency of occurrence of a particular tag may be used, or this type of sorting may be omitted. In one embodiment, the tags associated with the video may be included into a larger tag cloud, encompassing all, or a subset of publicly available videos.

In one embodiment, searching of the tags is enabled, at block 2050. In one embodiment, the results of the search, if any, are displayed along a timeline. In one embodiment, the search results may be lines along the timeline, illustrating when the searched-for tag appears for frames in the video. Alternative methods of associating the tags with the video, and of showing tags or searching for tags may be used. The process then ends, at block 255.

Figure 21:
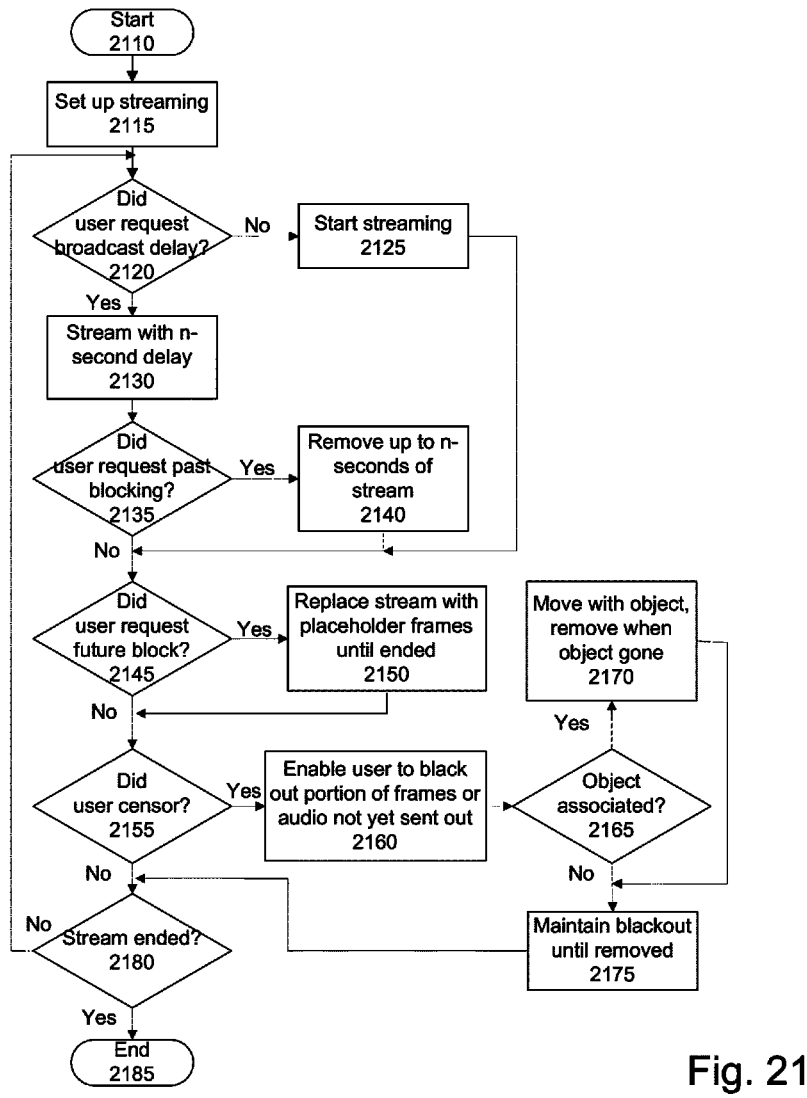
FIG. 21 is a flowchart of one embodiment of broadcast adjustments available to the streamer.

FIG. 21 is a flowchart of one embodiment of broadcast adjustments available to the streamer. The process starts at block 2110. At block 2115, the streaming is set up.

At block 2120, the process determines whether the user requested a broadcast delay. A broadcast delay is a delay inserted into a video stream so that video recorded at time T is sent out at time T+n where n is the number of seconds and/or frames of broadcast delay.

If the user did not request broadcast delay, the process continues to block 2125 and streaming is started. The process continues directly to block 2145. In one embodiment, the system continues to monitor to see if broadcast delay is requested at a later point, and if so, broadcast delay is started at that point, at block 2130.

If the user requested broadcast delay, at block 2130 the appropriate broadcast delay is inserted. In one embodiment, the broadcast delay is set to delay the time between receiving the stream at the server and sending the stream to recipients. In one embodiment, the broadcast delay further takes into account the delay between sending the stream to the recipients and the recipients receiving the stream.

At block 2135, the process determines whether the user requested past blocking. Past blocking is removing some audio or visual content from the video that has just been streamed. This is only possible due to broadcast delay, i.e. because the receipt of the video by the viewers is not instantaneous. If the user requests blocking, at block 2140 up to n-seconds of video or audio data can be removed from the stream. In one embodiment, replacement frames are inserted. In one embodiment, the prior frames are duplicated, or frames are interpolated from the prior and next subsequent frame. In another embodiment, an indication of the blocking is inserted, such as a beep for audio, or a black screen for video blocking.

At block 2145, the process determines whether the user requested a future block. A future block removes audio or visual content going forward. Future blocking, in one embodiment, may be available whether or not there is a broadcast delay. If a future block is requested, at block 2150 the system replaces the portion of the stream (audio, visual, or both) with placeholder data for the blocking period. In one embodiment, the user may remove blocking by clicking a button. This may be considered a parallel to the video hold feature discussed above, except that it can block only audio or only visual data, rather than disconnecting the viewer entirely from the stream.

At block 2155, the process determines whether the user wishes to censor. Censoring is blocking a portion of a frame, or audio, in this context. If the user chooses to censor, at block 2160 the user can black out a portion of a frame. In one embodiment, on a touch screen device this may be done by swiping a finger over the portion to be censored. The blocking will be applied to all frames not yet sent to the viewers, in one embodiment. Thus, censoring may apply to frames already sent by the user to the stream receiver, but not yet sent out by the stream broadcaster.

In one embodiment, at block 2165 the process determines whether an object is associated with the censoring. For example, the censorship may be blocking out the face of a person who wishes to remain anonymous, a body part, an address, etc. If the object is associated with censorship, the process in one embodiment tracks the object to maintain the blocking, at block 2170. This is described above with respect to embellishments. The blocking is maintained, at block 2175 until the blackout is removed. In one embodiment, this occurs automatically when the object that is blocked is no longer on the scene. In one embodiment, this occurs when the user manually removes the block.

At block 2180, the process determines whether the stream has ended. If so, the process ends at block 2185. If the stream is continuing, the process returns to block 2120 to continue providing the blocking processes. The overall term for blocking past or future audio or image data, or blocking a part of an image or audio is blocking. The blocking can ensure that even in almost-live video the content provided to invitees/viewers is controlled by the streamer.

Figure 22:
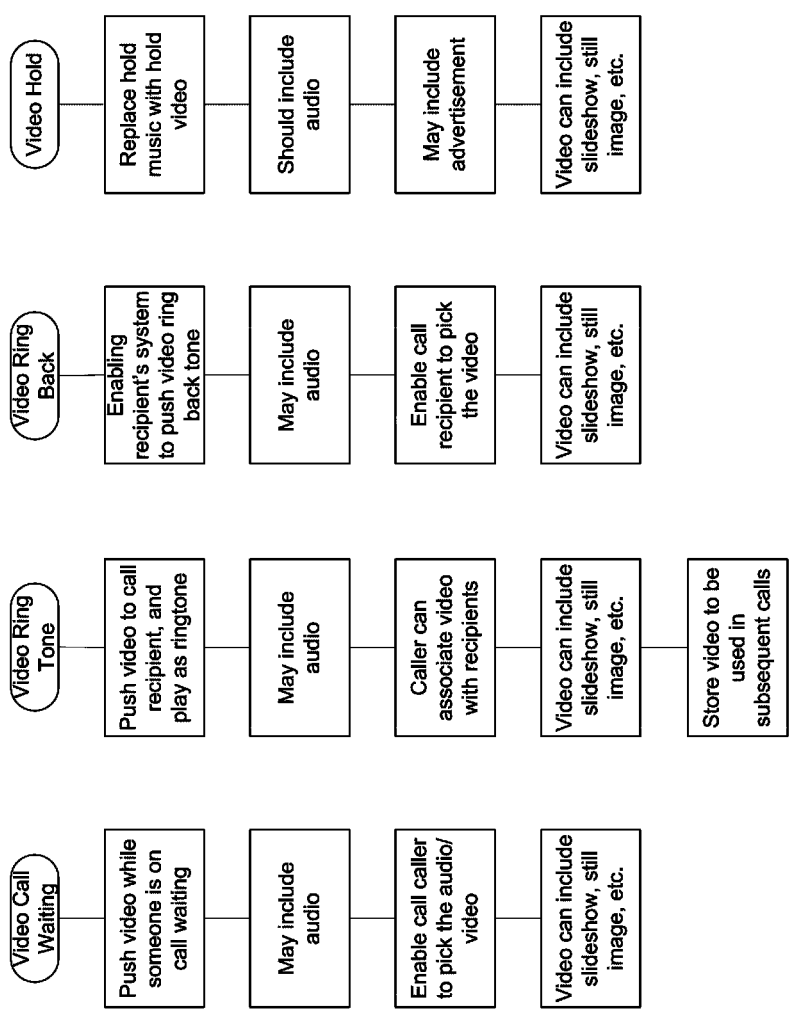
FIG. 22 is a chart of one embodiment of video call features that may be enabled through the present system.

FIG. 22 is a chart of one embodiment of some of the video call features that may be enabled through the present system. Video call features are available whenever the caller and/or the recipient of a call have the video streaming feature available. Each of these features can push audio, visual, or combined video & audio to users. The content may be user generated, general content made available by the service or by third parties. In one embodiment, the content may be premium content available by subscription or purchase. In one embodiment, the content may include advertising. In one embodiment, even if the actual content is user generated, the system may insert advertisement into the data.

Video call waiting enables the pushing of video (visual and/or audio data) to a call recipient, to indicate an incoming call when the recipient is already on a call. In one embodiment, video call waiting may play a video instead of inserting an audio tone into a call, or in addition to inserting an audio tone. In one embodiment, a default video call waiting video/audio combination is sent, for example one that sent "Video call incoming" audio/video data. In one embodiment, the call originator may select the audio/video data. The video data may include a slideshow, still image, or streaming live video, in one embodiment.

Video ring tone enables the use of a unique ringtone to indicate an incoming video call. In one embodiment, a default video/audio ring tone combination is sent, for example one that sent "Video call incoming" audio/video data. In one embodiment, the call originator may select the audio/video data. The video data may include a slideshow, still image, or streaming live video, in one embodiment. In one embodiment, the video may be stored for future use.

Video ring back is the tone heard by a caller when the phone is ringing. In one embodiment, the system may utilize a default video/audio combination, for example one that sent "awaiting pickup of video call" audio/video data. In one embodiment, the call receiver may select the audio/video data used for the ring back. The video data may include a slideshow, still image, or streaming live video, in one embodiment.

Video hold replaces traditional "hold music" with full audio-video hold experience. The person who places the hold may select the audio/video data used. This may be used for advertisements. The video data may include a slideshow, still image, or streaming live video, in one embodiment.

Figure 23:
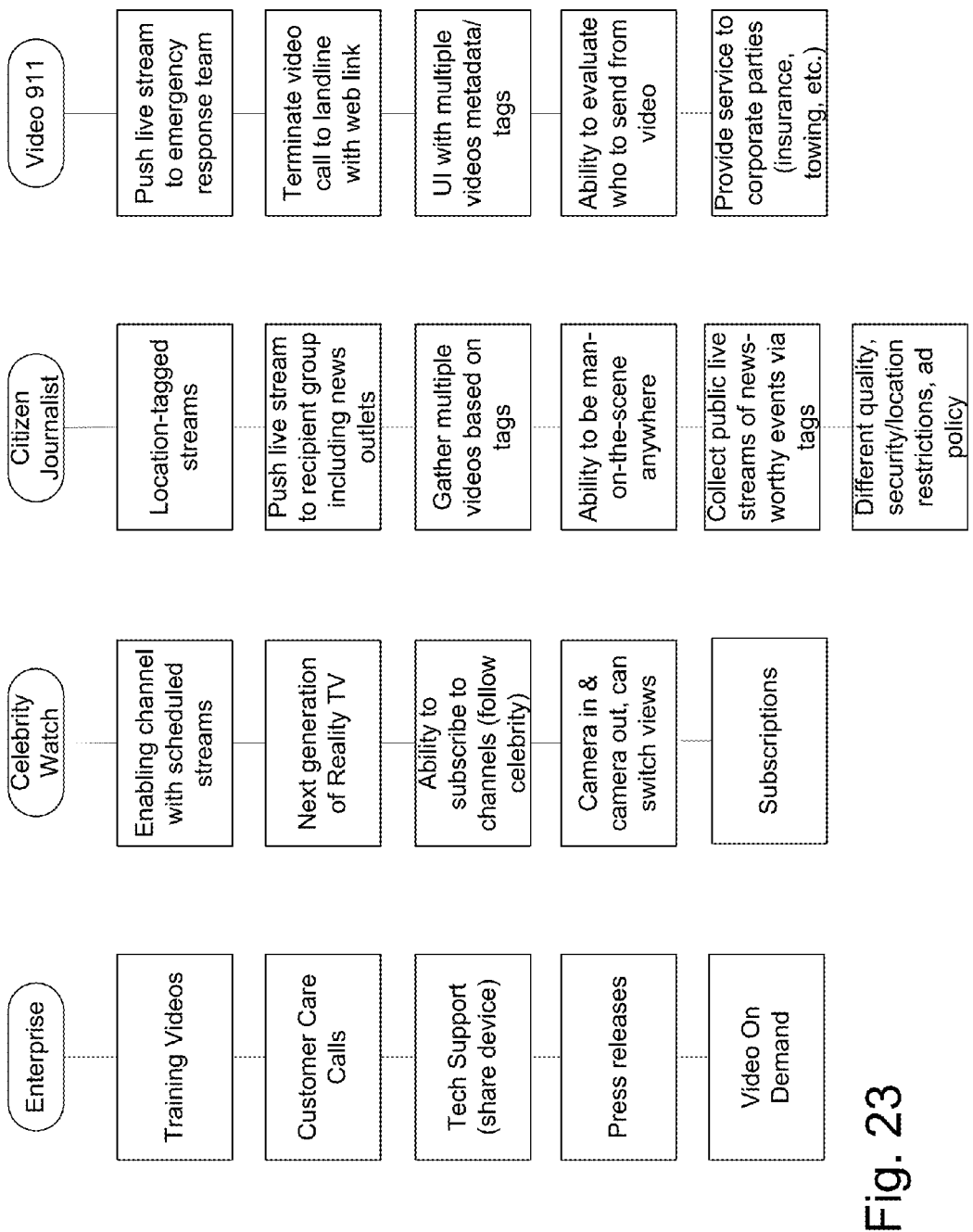
FIG. 23 is a chart of one embodiment of exemplary use cases with associated features.

FIG. 23 is a chart of one embodiment of exemplary use cases with associated features. One exemplary use case is when an enterprise uses the system to provide training videos, customer care calls, technical support, video press releases, and other video uses. In particular, enterprises would consider the real-time features of video streaming very useful. Furthermore, the ability to embellish a real-time would likely be useful, not only to insert a corporate logo but also to mark-up any presentations with relevant information, or inserting screen shots when appropriate, etc. In technical support cases, the two-way video aspect would be useful as well.

In one embodiment, the enterprise solution enables a connection of a brand to a consumer. The enterprise may provide videos from multiple sources as well, e.g. from a seminar in an office, from a tech support center overseas, and from the local sales office. Having the two-way calling feature may be useful for enterprise applications. In one embodiment, an enterprise may incorporate two-way video calling into its own outgoing stream. For example, a sales channel may provide "live vide" with a consumer who has purchased and received an object. This live video may in turn be broadcast to others.

In one embodiment, the system may provide two-way calling within the enterprise workforce. It may work with existing telepresence systems. For example, the hub providing interoperability may provide end points of existing POLYCOM™, CISCO™, SKYPE™ or other telepresence systems, in addition to the mobile device.

In one embodiment, the system may be designed to provide an ability to interact between a user, a recipient, and an application. For example, in the context or providing roadside assistance, or insurance services, the consumer and the corporation's representative may interact via two-way video. The video may simultaneously be provided to an application, which can have rule sets activated based on the currently recording scenario.

Another exemplary use of the system is for video on demand features. Video on demand, in one embodiment, may provide the ability to "dial in" into an on-going stream. For example, there may be a live video feed from a channel, e.g. breaking news or the like. The user may join the stream at any time, and may in one embodiment interact with the anchors or other stream originators. Another use of the on-demand video is to provide the ability to search for a product or topic in real-time and connect to an appropriate stream associated with that topic/product.

Another exemplary use case is that of celebrity watch. By using live streaming video, the system may provide a more real version of reality TV. The celebrity can send streaming live video. The ability to set up a channel with live and pre-packaged content would be useful for this use case. The ability to censor or block would also likely be useful, for example to provide some privacy to a celebrity by blocking the address, etc. In one embodiment, the system provides the ability of users to subscribe to a celebrity's channel. A subscription provides a notification, such that subscribers are automatically alerted when a subscription channel becomes active. In one embodiment, the celebrity may be able to charge for "exclusive" videos. This may provide an income stream for celebrities as well as the video service provider.

Another exemplary use case is that of citizen journalist. The ability to stream location-tagged live video can be used to provide real news real-time. In one embodiment, a user may send the live stream to a recipient group that is predefined. For example, the user may define a "recipient group" for news channels. The system would initiate connection with the one or more news channels, and send them streaming video, with commentary by the citizen journalist. The ability to have a man-on-the-scene can provide news channels a valuable resource. In one embodiment, if the citizen journalists make their videos public, the news channels can also try to find multiple videos from the same location at the same time, and get different perspectives on the breaking news story. In one embodiment, the news channel may gather multiple videos based on tags, including portions of videos that have particular tags.

In one embodiment, once the news channel finds a particular citizen journalist of interest, they can initiate a two-way connection with that citizen journalist, to get on-scene commentary, potentially with video. This can be especially useful for news events happening far away, where there are no local reporters available. In one embodiment, a user interface may enable the display of multiple videos concurrently. In one embodiment, news channels or other special subscribers may receive a special video feed. In one embodiment, the video feed to certain subscribers may be a higher quality. In one embodiment, certain content restrictions are removed, e.g. location restrictions may be overridden. In one embodiment, advertisements may be removed from the stream, etc.

Another exemplary use case is that of Video 911, or emergency assistance whether provided by a government agency, insurer, or other provider. Emergency reporting via mobile device is not optimal. Although E-911 now sends location information to the dispatcher, the dispatcher still cannot see anything of what is going on, and cannot evaluate the scene except by the information or panic level shown by the caller. If, on the other hand, the caller could provide a live video, it may enable evaluation by the dispatcher, to determine what resources should be sent. In one embodiment, the system would be able to send the audio data to a landline, with a video being made available via a web link. In one embodiment, an application that would be useful to 911 dispatchers would be a dashboard that would display of multiple videos in parallel, with appropriate location & other tags. This may be useful to enable a dispatcher to see multiple views of an incident, when multiple users call in. In one embodiment, in such cases, the video would have attached to it the originating telephone number (if there is one). This enables the dispatcher to link up the audio and the video component of the data.

Figure 24:
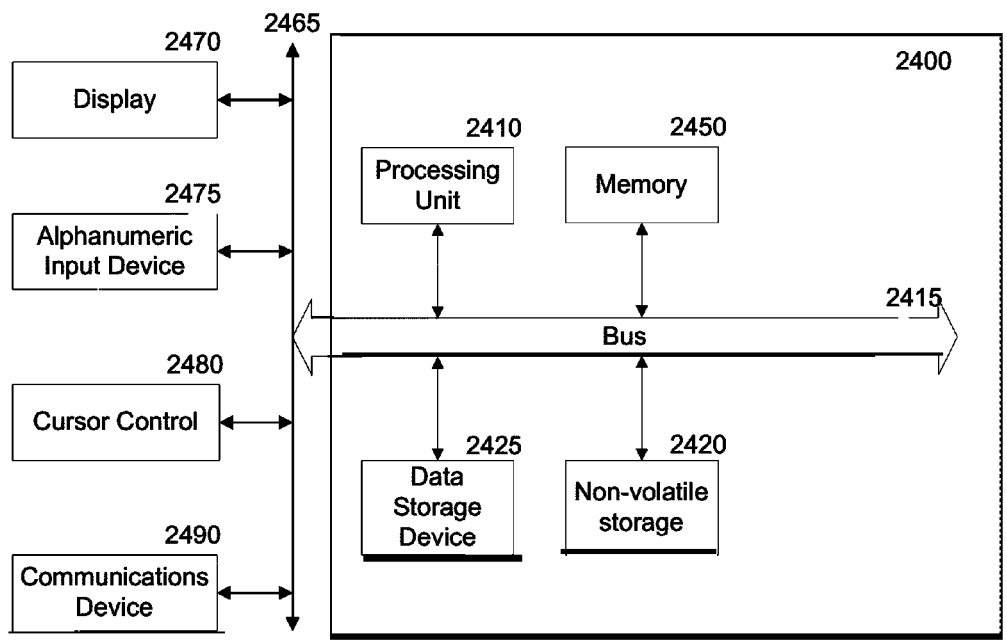
FIG. 24 is a block diagram of one embodiment of a computer system that may be used with the present invention.

FIG. 24 is a block diagram of a particular machine that may be used with the present invention. It will be apparent to those of ordinary skill in the art, however that other alternative systems of various system architectures may also be used.

The data processing system illustrated in FIG. 24 includes a bus or other internal communication means 2415 for communicating information, and a processor 2410 coupled to the bus 2415 for processing information. The system further comprises a random access memory (RAM) or other volatile storage device 2450 (referred to as memory), coupled to bus 2415 for storing information and instructions to be executed by processor 2410. Main memory 2450 also may be used for storing temporary variables or other intermediate information during execution of instructions by processor 2410. The system also comprises in one embodiment a read only memory (ROM) and/or static storage device 2420 coupled to bus 2415 for storing static information and instructions for processor 2410, and a data storage device 2425 such as a magnetic disk or optical disk and its corresponding disk drive, or Flash memory or other storage, which is capable of storing data when no power is supplied to the system. Data storage device 2425 in one embodiment is coupled to bus 2415 for storing information and instructions.

The system may further be coupled to a display device 2470, such as a cathode ray tube (CRT) or a liquid crystal display (LCD) coupled to bus 2415 through bus 2465 for displaying information to a computer user. An alphanumeric input device 2475, such as a keyboard including alphanumeric and other keys, may also be coupled to bus 2415 through bus 2465 for enabling a user to communicate information and command selections to processor 2410. An additional user input device may further be included. One such user input device is cursor control device 2480, such as a mouse, a trackball, stylus, or cursor direction keys may be coupled to bus 2415 through bus 2465 for communicating direction information and command selections to processor 2410, and for controlling cursor movement on display device 2470.

Another device, which may optionally be coupled to computer system 2400, is a communication device 2490 for accessing other nodes of a distributed system via a network. The communication device 2490 may include any of a number of commercially available networking peripheral devices such as those used for coupling to an Ethernet, token ring, Internet, or wide area network, personal area network, wireless network, or other method of accessing other devices. The communication device 2490 may further be a null-modem connection, or any other mechanism that provides connectivity between the computer system 2400 and the outside world. Note that any or all of the components of this system illustrated in FIG. 24 and associated hardware may be used in various embodiments of the present invention.

It will be appreciated by those of ordinary skill in the art that the particular machine, which embodies the present invention may be configured in various ways according to the particular implementation. The control logic or software implementing the present invention can be stored in main memory 2450, mass storage device 2425, or other storage medium locally or remotely accessible to processor 2410.

It will be apparent to those of ordinary skill in the art that the system, method, and process described herein can be implemented as software stored in main memory 2450 or read only memory 2420 and executed by processor 2410. This control logic or software may also be resident on an article of manufacture comprising a computer readable medium having computer readable program code embodied therein and being readable by the mass storage device 2425 and for causing the processor 2410 to operate in accordance with the methods and teachings herein.

The present invention may also be embodied in a handheld or portable device containing a subset of the computer hardware components described above. For example, the handheld device may be configured to contain only the bus 2415, the processor 2410, and memory 2450 and/or 2425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 2410, a data storage device 2425, a bus 2415, and memory 2450, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 2410. A machine-readable medium includes any mechanism for storing information in a form readable by a machine (e.g. a computer). For example, a machine-readable medium includes read-only memory (ROM), random access memory (RAM), magnetic disk storage media, optical storage media, flash memory devices, or other storage media that may be used for temporary or permanent data storage. In one embodiment, the control logic may be implemented as transmittable data, such as electrical, optical, acoustical, or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    sending a smart notification of a live video stream to one or more invites, the smart notification including validation information;
    receiving a request to connect to the live video stream from an invitee, wherein the video stream is transmitted live from a streamer;

validating the invitee, based on the validation information in the smart notification;
for validation invitees,
  determining a platform, device, and a carrier, when appropriate;
  determining a connection level between the invitee and the streamer;
  establishing the connection between the invitee and the streamer;
  selecting an optimal format for the video stream based on the data available to enable the video stream to be received by the invitee in the optimal format.

2. The method of claim 1, further comprising:
receiving notification of an incipient video stream from the streamer, the notification including an invitee; and
posting an invitation to the invitee.

3. The method of claim 2, further comprising:
upon receiving the request to connect from the invitee, verifying that the invitee is associated with the invitation prior to enabling the connection.

4. The method of claim 2, wherein the invitation is unique, and the invitation is limited to one or more of: a user, a device, a certain number of users, a location, and a timeframe.

5. The method of claim 1, further comprising:
determining whether the video stream requires translation to the optimal format; and
when the video stream does not need translation, connecting the streamer and the invitee directly, and otherwise remaining in the video stream to translate on-the-fly.

6. The method of claim 1, further comprising, when determining the connection level comprises:
determining a maximum level of service available based on a combination of available data selected from: the video stream, the platform, the carrier, and the device of the invitee.

7. The method of claim 6, wherein the available data further includes user preference.

8. The method of claim 6, wherein the maximum level of service comprises one of: full duplex video and audio, full duplex audio and alternating video, full duplex audio and one-way video, full duplex audio and no video, alternating audio.

9. The method of claim 1, further comprising:
providing a notification to the streamer when an invitee joins the stream.

10. The method of claim 9, wherein the notification comprises one of a pop-up of the invitee's name, an increase of a viewer count, or an increase of a viewer count associated with an identified social network.

11. The method of claim 1, further comprising:
enabling a user to view a video presence status of a potential invitee, the video presence status indicating whether the potential invitee is available for a video connection.

12. The method of claim 11, wherein the availability indicate the availability to send video back to the streamer.

13. The method of claim 1, further comprising, during the stream when the streamer's recording is a higher frame rate than available at a current bandwidth level, adjusting an image resolution to enable the recording to be approximately time-aligned with the current bandwidth level.

14. The method of claim 1, further comprising, during the stream when the streamer's recording is a higher frame rate than available at a current bandwidth level, dropping a subset of frames to enable the recording to be approximately time-aligned with the current bandwidth level.

15. The method of claim 14, further comprising:
temporarily storing the subset of frames dropped; and
sending the subset of frames dropped and inserting the subset of frames back into the movie.

16. The method of claim 1, further comprising, when the streamer's video is interrupted:
automatically inserting one or more frames into the invitee's received stream, to maintain the connection between the streamer and the invitee.

17. The method of claim 1, further comprising:
upon receiving a disconnect indicator from the streamer or the invitee, inserting a plurality of frames to conclude the broadcast.

18. A mobile streaming ecosystem comprising:
an access validator to receive a request to connect to a live video stream from an invitee, wherein the video stream is transmitted live from a streamer, the access validator verifying a smart notification used by the invitee for the request, to determine whether the invitee is authorized to connect to the live video stream;
capability detection logic to determine a platform, device, and a carrier, when appropriate, and determining a connection level between the invitee and the streamer;
translator to select an optimal format for the video stream based on the data available; and
a video transmitter to establish the connection between the invitee and the streamer.

19. The system of claim 18, further comprising:
a notification logic to receive a notification of an incipient video stream from the streamer including an invitee, and posting an invitation to the invitee.

20. The system of claim 19, further comprising:
the access validator to, upon receiving the request to connect from the invitee, verifying that the invitee is associated with the invitation prior to enabling the connection.

21. The system of claim 20, wherein the invitation is unique, and the invitation is limited to one or more of: a user, a device, a certain number of users, a location, and a timeframe.

22. The system of claim 19, further comprising:
a client logic to, during the stream when the streamer's recording is a higher frame rate than available at a current bandwidth level, adjusting an image resolution or dropping a subset of frames to enable the recording to be approximately time-aligned with the current bandwidth level.

23. The system of claim 22, further comprising:
the client logic to temporarily store the subset of frames dropped and send the subset of frames dropped; and
a frame inserter to re-insert the subset of frames back into the movie.

24. The system of claim 18, further comprising:
the translator to determine whether the video stream requires translation to the optimal format; and
the communication logic to connect the streamer and the invitee directly when the video stream does not need translation, and otherwise remaining in the video stream to translate on-the-fly.

25. The system of claim 18, further comprising, when determining the connection level comprises determining a maximum level of service available based on a combination of available data selected from: the video stream, the platform, the carrier, the device of the invitee, and a user preference.

26. The system of claim 25, wherein the maximum level of service comprises one of: full duplex video and audio, full duplex audio and alternating video, full duplex audio and one-way video, full duplex audio and no video, alternating audio.

27. The system of claim 18, further comprising:
a notifier to inform the streamer when an invitee joins the stream.

28. The system of claim 18, wherein the information to the streamer comprises one of: a pop-up of the invitee's name, an increase of a viewer count, or an increase of a viewer count associated with an identified social network.

29. The system of claim 18, further comprising:
a notifier enabling a user to view a video presence status of a potential invitee, the video presence status indicating whether the potential invitee is available for a video connection.

30. The system of claim 18, further comprising:
a frame inserter to, upon receiving a disconnect indicator from the streamer or the invitee, inserting a plurality of frames to conclude the broadcast.

31. The system of claim 18, further comprising:
a frame inserter to, when the streamer's video is interrupted, automatically inserting one or more frames into the invitee's received stream, to maintain the connection between the streamer and the invitee.

* * * * *